(12) United States Patent
Phuyal et al.

(10) Patent No.: US 11,902,828 B2
(45) Date of Patent: Feb. 13, 2024

(54) RADIO LINK CONTROL FORWARD COMPATIBILITY FOR MULTICAST MESSAGES OR BROADCAST MESSAGES

(71) Applicant: QUALCOMM Incorporated, San Diego, CA (US)

(72) Inventors: Umesh Phuyal, San Diego, CA (US); Alberto Rico Alvarino, San Diego, CA (US); Prasad Reddy Kadiri, San Diego, CA (US); Le Liu, San Jose, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/299,859

(22) Filed: Apr. 13, 2023

(65) Prior Publication Data
US 2023/0254734 A1    Aug. 10, 2023

Related U.S. Application Data

(63) Continuation of application No. 17/302,257, filed on Apr. 28, 2021, now Pat. No. 11,665,584.

(51) Int. Cl.
*H04W 28/04* (2009.01)
*H04L 1/00* (2006.01)
(Continued)

(52) U.S. Cl.
CPC ........... *H04W 28/04* (2013.01); *H04L 1/0025* (2013.01); *H04L 1/0061* (2013.01); *H04L 1/1896* (2013.01); *H04W 4/06* (2013.01)

(58) Field of Classification Search
CPC ....... H04W 28/04; H04W 4/06; H04W 76/40; H04L 1/0025; H04L 1/0061;
(Continued)

(56) References Cited

U.S. PATENT DOCUMENTS

| 2022/0311539 | A1* | 9/2022 | Sebire | H04L 1/1877 |
| 2022/0329982 | A1* | 10/2022 | Kim | H04W 76/19 |
| 2022/0353734 | A1 | 11/2022 | Phuyal et al. | |

FOREIGN PATENT DOCUMENTS

| EP | 1641189 A1 * | 3/2006 | ......... H04L 12/1868 |
| EP | 1641189 A1 | 3/2006 | |

OTHER PUBLICATIONS

CATT: "Reliability Enhancement for PTM Transmission", 3GPP TSG RAN WG2#112-e, R2-2008792, 3rd Generation Partnership Project, Mobile Competence Centre, 650, Route Des Lucioles, F-06921 Sophia-Antipolis Cedex, France, vol. RAN WG2, No. Electronic Meeting, Nov. 2, 2020-Nov. 13, 2020, Oct. 23, 2020, XP051941898, 7 Pages.

(Continued)

*Primary Examiner* — Afshawn M Towfighi
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a base station, a multicast message or a broadcast message that uses a radio link control (RLC) format associated with an RLC acknowledged mode (RLC-AM). The UE may decode the multicast message or the broadcast message to identify information associated with an RLC unacknowledged mode (RLC-UM) based at least in part on a capability of the UE. The UE may operate in accordance with the RLC-UM based at least in part on decoding the multicast message or the broadcast message. Numerous other aspects are provided.

20 Claims, 14 Drawing Sheets

(51) Int. Cl.
*H04L 1/1867* (2023.01)
*H04W 4/06* (2009.01)

(58) Field of Classification Search
CPC ..... H04L 1/1896; H04L 12/189; H04L 67/04; H04L 2001/0093; H04L 1/1829
See application file for complete search history.

(56) References Cited

OTHER PUBLICATIONS

International Search Report and Written Opinion—PCT/US2022/071131—ISA/EPO—dated Jun. 17, 2022.
Qualcomm Inc, et al., "NR Multicast PTM Bearer RLC AM Mode Operation", 3GPP TSG-RAN WG2 Meeting #113e, R2-2100319 (Revision of R2-2009034), 3rd Generation Partnership Project, Mobile Competence Centre, 650, Route Des Lucioles, F-06921 Sophia-Antipolis Cedex, France, vol. RAN WG2, No. E-Meeting, Jan. 25, 2021-Feb. 5, 2021, Jan. 15, 2021, XP051973511, 9 Pages.
VIVO: "Reliability for MBS Service", 3GPP TSG-RAN WG2 Meeting #113-e, R2-2100832, 3rd Generation Partnership Project, Mobile Competence Centre, 650, Route Des Lucioles, F-06921 Sophia-Antipolis Cedex, France, vol. RAN WG2, No. Online, Jan. 25, 2021-Feb. 5, 2021, Jan. 15, 2021, XP051973929, 4 Pages.

\* cited by examiner

RADIO LINK CONTROL FORWARD COMPATIBILITY FOR MULTICAST MESSAGES OR BROADCAST MESSAGES

RELATED APPLICATION

This application is a continuation of U.S. patent application Ser. No. 17/302,257, filed Apr. 28, 2021, entitled "RADIO LINK CONTROL FORWARD COMPATIBILITY FOR MULTICAST MESSAGES OR BROADCAST MESSAGES," which is incorporated herein by reference in its entirety.

FIELD OF THE DISCLOSURE

Aspects of the present disclosure generally relate to wireless communication and specifically, to techniques and apparatuses for radio link control (RLC) forward compatibility for multicast messages or broadcast messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some cases, wireless networks may support broadcast communication, in which a communication is provided to all UEs of a cell, or multicast communication, in which a communication is provided to a group of UEs. Broadcast or multicast (broadcast/multicast) communications may be useful for broad dissemination of information, such as emergency alerts, audio content, or video content, among other examples. In some cases, UEs in a wireless network, or UEs in a cell, may have different capabilities for multicast messages or broadcast messages (referred to herein as "multicast/broadcast messages"). For example, for a set of UEs in a cell, a first subset (one or more) of the UEs may support a feature for multicast/broadcast messages and a second subset (one or more) of the UEs may not support the feature for multicast/broadcast messages.

Multicast and broadcast services introduce additional complexity associated with ensuring forward compatibility for UEs operating in the wireless network. For example, a base station may transmit a multicast data stream or a broadcast data stream that is associated with a feature or enhancement of a feature (such as a feature or enhancement of a feature that is introduced in a release of a wireless communication standard). However, some UEs that receive the multicast data stream or the broadcast data stream may not support the feature or enhancement and may not be capable of receiving or decoding the multicast data stream or the broadcast data stream at all (for example, even when disregarding the associated feature or enhancement). Therefore, a base station may be required to transmit multiple multicast data streams or broadcast data streams associated with the same content to ensure that all UEs in the network are enabled to receive and decode a multicast message or a broadcast message. This adds additional complexity and signaling overhead associated with ensuring that UEs with different capabilities are enabled to receive the multicast/broadcast messages.

SUMMARY

Some aspects described herein provide a user equipment (UE) for wireless communication includes at least one processor and at least one memory communicatively coupled with the at least one processor and storing processor-readable code. In some aspects, the processor-readable code, when executed by the at least one processor, is configured to cause the UE to receive, from a base station, a multicast message or a broadcast message that uses a radio link control (RLC) format associated with an RLC acknowledged mode (RLC-AM). In some aspects, the processor-readable code, when executed by the at least one processor, is configured to cause the UE to decode the multicast message or the broadcast message to identify information associated with an RLC unacknowledged mode (RLC-UM) based at least in part on a capability of the UE. In some aspects, the processor-readable code, when executed by the at least one processor, is configured to cause the UE to operate in accordance with the RLC-UM based at least in part on decoding the multicast message or the broadcast message.

Some aspects described herein provide a method of wireless communication performed by a UE. The method may include receiving, from a base station, a multicast message or a broadcast message that uses an RLC format associated with an RLC-AM. The method may include decoding the multicast message or the broadcast message to identify information associated with an RLC-UM based at least in part on a capability of the UE. The method may include operating in accordance with the RLC-UM based at least in part on decoding the multicast message or the broadcast message.

Some aspects described herein provide non-transitory computer-readable medium storing a set of instructions for wireless communication. The set of instruction may include one or more instructions that, when executed by one or more processors of a UE, cause the UE to receive, from a base station, a multicast message or a broadcast message that uses an RLC format associated with an RLC-AM. In some aspects, the one or more instructions, when executed by one or more processors of a UE, cause the UE to decode the multicast message or the broadcast message to identify information associated with an RLC-UM based at least in part on a capability of the UE. In some aspects, the one or more instructions, when executed by one or more processors of a UE, cause the UE to operate in accordance with the RLC-UM based at least in part on decoding the multicast message or the broadcast message.

Some aspects described herein provide an apparatus for wireless communication. The apparatus may include means for receiving, from a base station, a multicast message or a broadcast message that uses an RLC format associated with an RLC-AM. The apparatus may include means for decoding the multicast message or the broadcast message to identify information associated with an RLC-UM based at least in part on a capability of the apparatus. The apparatus may include means for operating in accordance with the RLC-UM based at least in part on decoding the multicast message or the broadcast message.

Some aspects described herein provide a base station for wireless communication includes at least one processor and at least one memory communicatively coupled with the at least one processor and storing processor-readable code that. In some aspects, the processor-readable code, when executed by the at least one processor, is configured to cause the base station to generate a multicast message or broadcast message using an RLC format associated with an RLC-AM. In some aspects, the processor-readable code, when executed by the at least one processor, is configured to cause the base station to transmit the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message.

Some aspects described herein provide a method of wireless communication performed by a base station. The method may include generating a multicast message or broadcast message using an RLC format associated with an RLC-AM. The method may include transmitting the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message.

Some aspects described herein provide a non-transitory computer-readable medium storing a set of instructions for wireless communication. The set of instructions may include one or more instructions that, when executed by one or more processors of a base station, cause the base station to generate a multicast message or broadcast message using an RLC format associated with an RLC-AM. In some aspects, the one or more instructions, when executed by one or more processors of a base station, cause the base station to transmit the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message.

Some aspects described herein provide an apparatus for wireless communication. The apparatus may include means for generating a multicast message or broadcast message using an RLC format associated with an RLC-AM. The apparatus may include means for transmitting the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

unacknowledged mode (RLC-UM) and a PDU format for an RLC acknowledged mode (RLC-AM), in accordance with the present disclosure.

FIGS. 6A-6E are diagram illustrating an example associated with RLC forward compatibility for multicast messages or broadcast messages, in accordance with the present disclosure.

Figure 7:
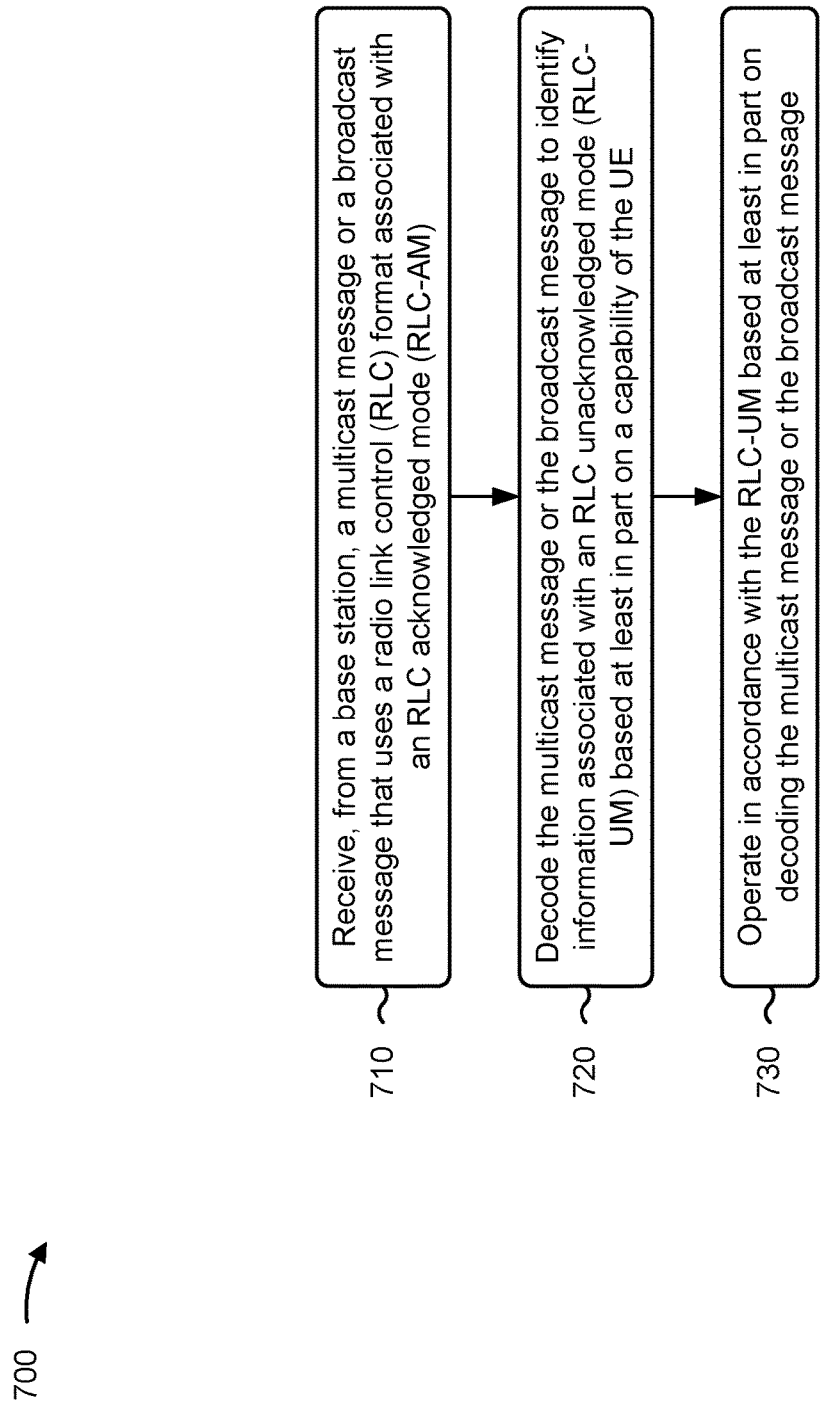

FIG. 7 is a flowchart illustrating an example process performed, for example, by a UE to support RLC forward compatibility for multicast messages or broadcast messages, in accordance with the present disclosure.

Figure 8:
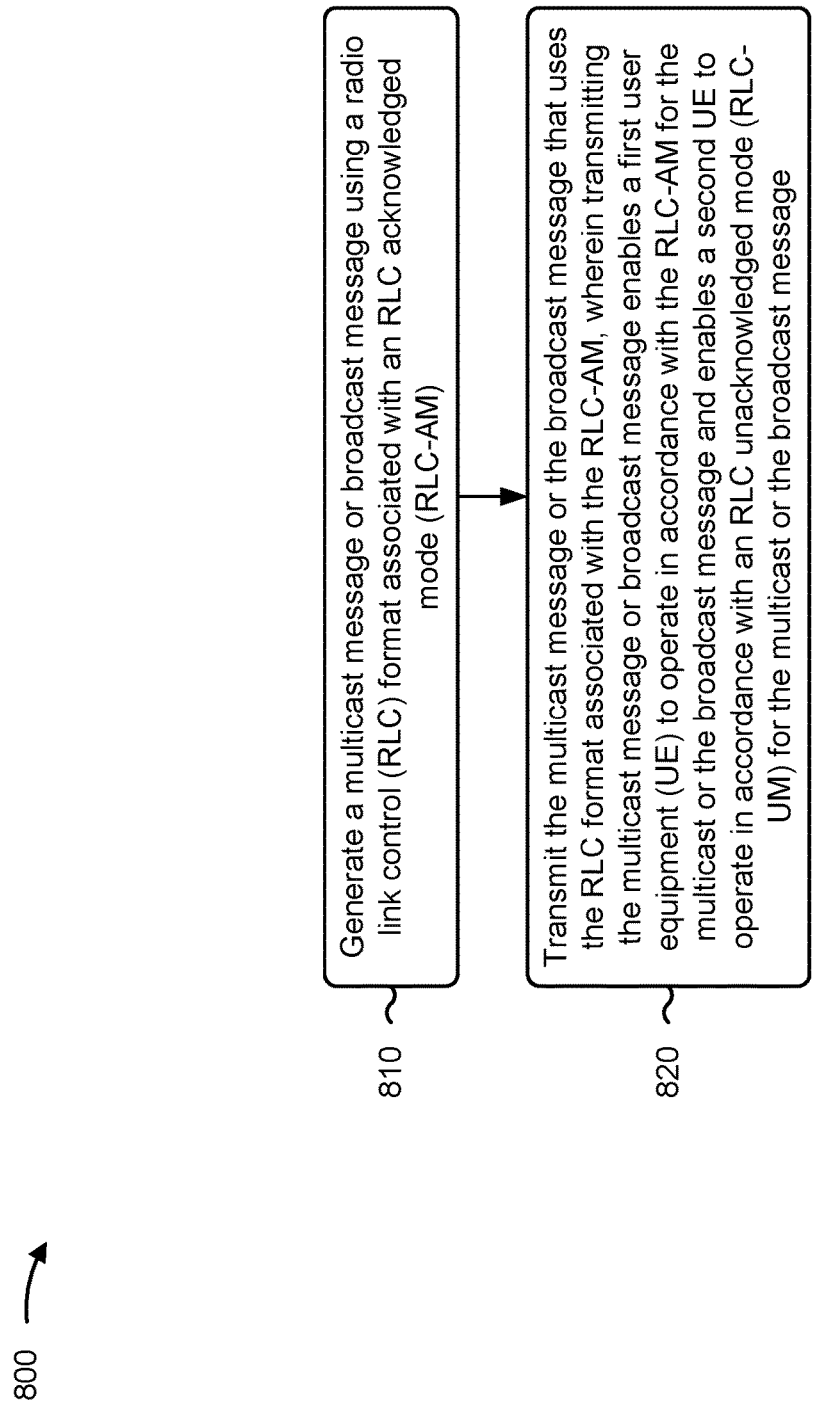

FIG. 8 is a flowchart illustrating an example process performed, for example, by a base station to support RLC forward compatibility for multicast messages or broadcast messages, in accordance with the present disclosure.

Figure 9:
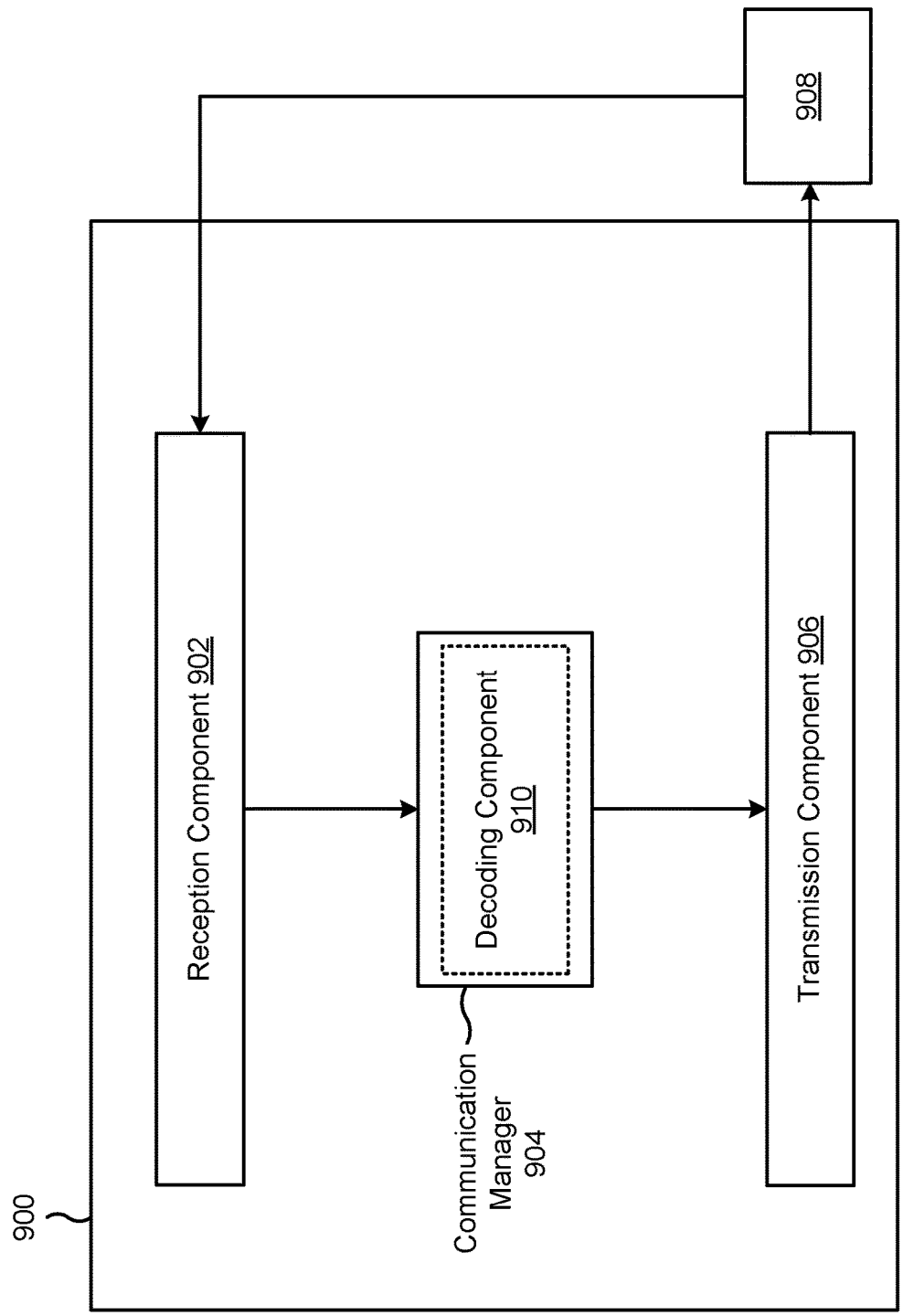
Figure 10:
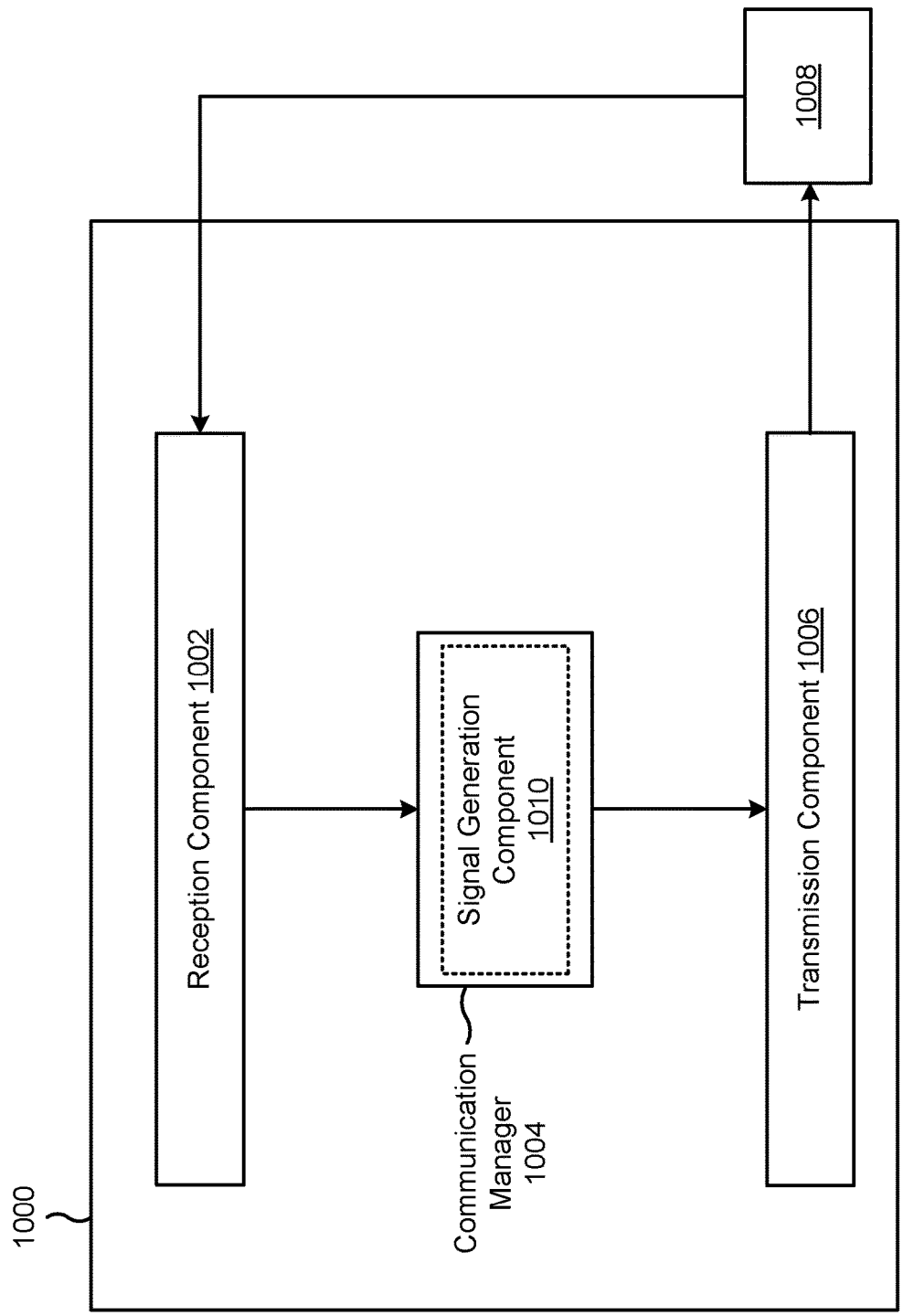

FIGS. 9 and 10 are block diagrams of example apparatuses for wireless communication to support RLC forward compatibility for multicast messages or broadcast messages, in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to radio link control (RLC) forward compatibility for multicast messages or broadcast messages. Some aspects more specifically relate to enabling a base station to transmit a single multicast or broadcast (multicast/broadcast) data stream that enables a first UE to operate in accordance with an RLC unacknowledged mode (RLC-UM) for the single multicast/broadcast data stream and a second UE to operate in accordance with an RLC acknowledged mode (RLC-AM) for the single multicast/broadcast data stream. In some aspects, the first UE that does not support RLC-AM procedures for multicast/broadcast messages may be enabled to decode a multicast/broadcast message that uses a format associated with the RLC-AM. For example, the first UE may identify and extract information associated with the RLC-UM in the multicast/broadcast message when the multicast/broadcast message uses a format associated with the RLC-AM. The first UE may operate in accordance with the RLC-UM using the extracted information in the multicast/broadcast message. For example, the first UE may extract information associated with the RLC-UM (such as segmentation information or a sequence number) and may receive RLC packets from the base station in accordance with the RLC-UM (such as without providing feedback information that would otherwise be associated with the RLC-AM).

In some aspects, the first UE may identify that the format associated with the RLC-AM is used for multicast/broadcast messages based at least in part on receiving a radio resource control (RRC) configuration indicating that UEs are to use the RLC-AM for multicast/broadcast messages. The first UE may decode a multicast/broadcast message that uses the format associated with the RLC-AM, ignore the RRC configuration, and operate in accordance with the RLC-UM for the multicast/broadcast message that uses the format associated with the RLC-AM.

In some other aspects, a base station may use a packet data unit (PDU) format that is associated with multicast or broadcast services (MBS) or point-to-multipoint services (for example, an MBS PDU format). The MBS PDU format may include one or more reserved bits or one or more other bits associated with the RLC-AM. The first UE that does not support the RLC-AM for multicast/broadcast messages may ignore the one or more reserved bits or one or more other bits associated with the RLC-AM and may be enabled to receive and decode the multicast/broadcast messages that use the MBS PDU format to enable the first UE to operate in accordance with the RLC-UM for the multicast/broadcast messages. Similarly, the second UE that does support the RLC-AM for multicast/broadcast messages may recognize and decode the bits associated with the RLC-AM to enable the second UE to operate in accordance with the RLC-AM for the same multicast/broadcast messages that use the MBS PDU format.

In some other aspects, a base station may be enabled to indicate whether a packet is associated with a network coding feature or a forward error correction feature using a reserved bit of an RLC header or a packet data convergence protocol (PDCP) PDU format that indicates that a packet is a parity packet or a redundancy packet for the network coding feature or the forward error correction feature. In some other aspects, the base station may be enabled to indicate whether a packet is associated with a network coding feature or a forward error correction feature using an RLC control PDU header consisting of a data or control (D/C) indication field and a Control PDU Type (CPT) field where the CPT field indicates that a packet is a parity packet or a redundancy packet for the network coding feature or the forward error correction feature. Therefore, UEs that do not support the network coding feature or the forward error correction feature for multicast/broadcast messages may ignore or discard the packet associated with the network coding feature or the forward error correction feature (as a reserved bit or an unrecognized PDCP PDU format is used for the packet). Additionally, UEs that do support the network coding feature or the forward error correction feature for multicast/broadcast messages may be enabled to recognize that the packet is associated with the network coding feature or the forward error correction feature (for example, based at least in part on the information conveyed via the reserved bit or the PDCP PDU format). Therefore, the UE may receive or decode the packet to enable the UE to operate in accordance with the network coding feature or the forward error correction feature for the multicast/broadcast message.

Particular aspects of the subject matter described in this disclosure can be implemented to realize one or more of the following potential advantages. In some examples, the described techniques can be used to enable a single multicast/broadcast message to support a first UE that is not capable of supporting a feature or enhancement and a second UE that is capable of supporting the feature or the enhancement. For example, a single multicast/broadcast data stream may enable a first UE to operate in accordance with the RLC-UM for the single multicast/broadcast data stream and may enable a second UE to operate in accordance with the RLC-AM for the single multicast/broadcast data stream. Additionally or alternatively, a single multicast/broadcast data stream may enable a first UE to discard parity packets or redundancy packets while still receiving the information included in the single multicast/broadcast data stream and may enable a second UE to operate in accordance with a network coding feature or a forward error correction feature for the multicast/broadcast data stream. This conserves a signaling overhead that would have otherwise been used to transmit multiple multicast/broadcast messages to support a first UE that is not capable of supporting a feature or enhancement and a second UE that is capable of supporting the feature or enhancement within a cell or a wireless network. Moreover, this reduces a complexity associated with ensuring forward compatibility for RLC features associated with multicast/broadcast messages.

Figure 1:
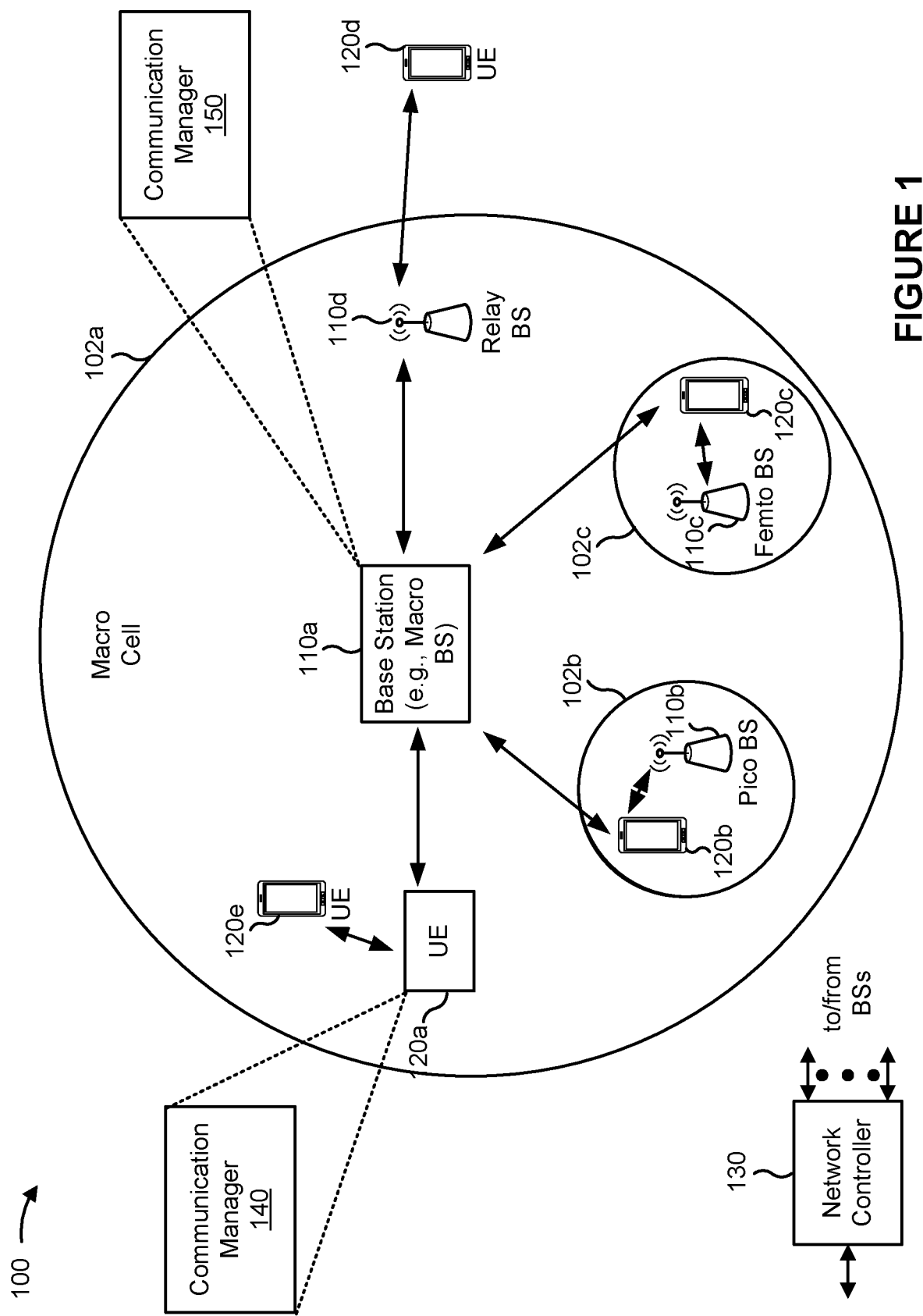
FIG. 1 is a diagram illustrating an example of a wireless network in accordance with the present disclosure.

FIG. 1 is a diagram illustrating an example of a wireless network in accordance with the present disclosure. The wireless network may be or may include elements of a 5G New Radio (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, from a base station, a multicast message or a broadcast message that uses a radio link control (RLC) format associated with an RLC acknowledged mode (RLC-AM); decode the multicast message or the broadcast message to identify information associated with an RLC unacknowledged mode (RLC-UM) based at least in part on a capability of the UE; and operate in accordance with the RLC-UM based at least in part on decoding the multicast message or the broadcast message. Additionally or alternatively, the communication manager 140 may perform one or more other operations described herein.

In some aspects, the base station 110 may include a communication manager 150. As described in more detail elsewhere herein, the communication manager 150 may generate a multicast message or broadcast message using an RLC format associated with an RLC acknowledged mode (RLC-AM); and transmit the multicast message or the broadcast message that uses the RLC format associated with the RLC-AM, wherein transmitting the multicast message or broadcast message enables a first UE to operate in accordance with the RLC-AM for the multicast or the broadcast message and enables a second UE to operate in accordance with an RLC-UM for the multicast or the broadcast message. Additionally or alternatively, the communication manager 150 may perform one or more other operations described herein.

Figure 2:
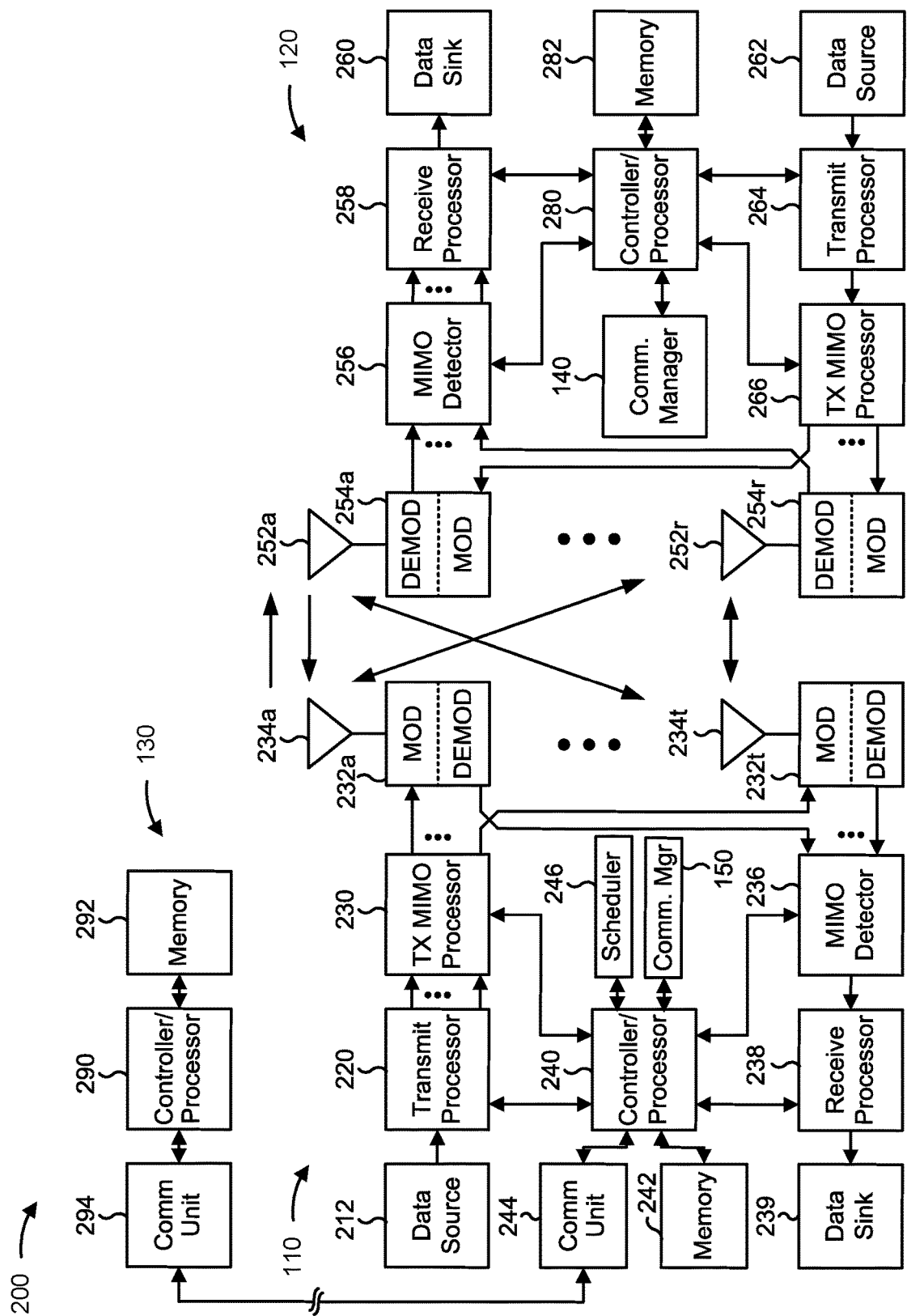
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCS s) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with RLC forward compatibility for multicast messages or broadcast messages, as described in more detail elsewhere herein. For example, controller/processor 240 of base station 110, controller/processor 280 of UE 120, or any other component(s) of FIG. 2 may perform or direct operations of, for example, process 700 of FIG. 7, process 800 of FIG. 8, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, process 800 of FIG. 8, or other processes as described herein. In some aspects, executing instructions may include running the instructions, converting the instructions, compiling the instructions, or interpreting the instructions, among other examples.

In some aspects, the UE 120 includes means for receiving, from a base station, a multicast message or a broadcast message that uses an RLC format associated with an RLC-AM; means for decoding the multicast message or the broadcast message to identify information associated with an RLC-UM based at least in part on a capability of the UE; or means for operating in accordance with the RLC-UM based at least in part on decoding the multicast message or the broadcast message. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for generating a multicast message or broadcast message using an RLC format associated with an RLC-AM; or means for transmitting the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

Figure 3:
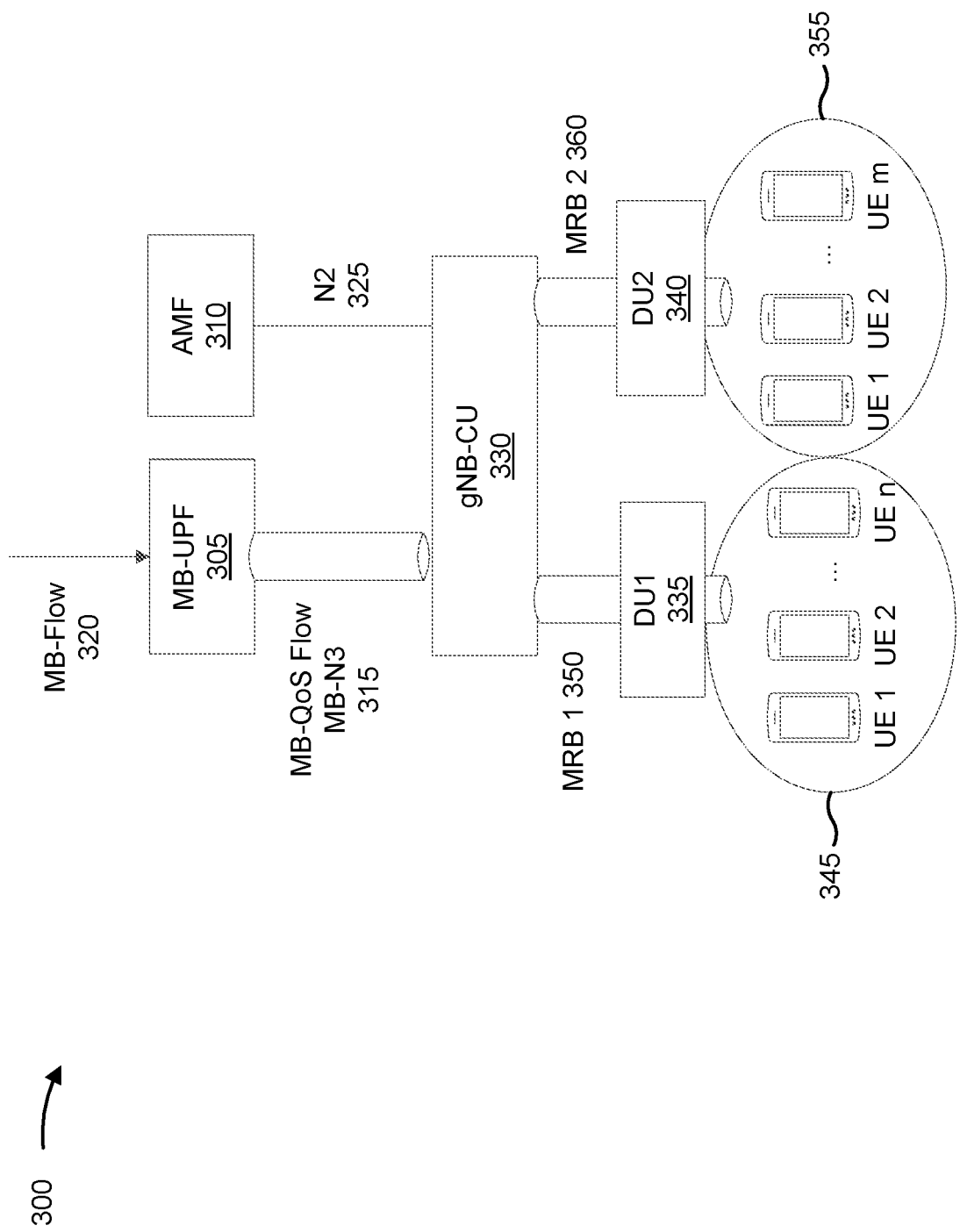
FIG. 3 is a diagram illustrating a logical architecture of a distributed radio access network (RAN), in accordance with the present disclosure.

FIG. 3 is a diagram illustrating a logical architecture 300 of a distributed radio access network (RAN), in accordance with the present disclosure. One or more entities of a 5G network may have a multicast or broadcast user plane function (MB-UPF) 305 and an access and mobility function (AMF) 310. The MB-UPF 305 may have an N3 interface 315 for delivering an MB-flow 320 of packets (for example, in the form of protocol data units (PDUs)) to a 5G access node, such as a gNB or base station 110. The AMF 310 may control signaling for MB-flow setup and modification using an N2 interface 325 with the gNB.

The gNB may include a central unit (CU), shown as gNB-CU 330. The gNB may also include one or more distributed units (DUs), shown as DU1 335 and DU2 340. The DU1 335 and the DU2 340 may be configured to individually (for example, via dynamic selection) or jointly (for example, via joint transmission) serve traffic to UEs. As shown, DU1 335 may serve traffic to a first UE or a first group of UEs 345 using a first multicast or broadcast radio bearer (MRB), shown as MRB1 350, and DU2 340 may serve traffic to a second UE or a second group of UEs 355 using a second MRB, shown as MRB2 360.

In some cases, wireless networks may support broadcast communication, in which a communication is provided to all UEs of a cell, or multicast communication, in which a communication is provided to a group of UEs. Broadcast or multicast (broadcast/multicast) communications may be useful for broad dissemination of information, such as emergency alerts, audio content, or video content, among other examples. Support for multicast or broadcast services is being added to NR. In NR, a UE may be capable of receiving, for example, multicast or broadcast services in a mixed mode or a broadcast mode. Using mixed mode, multicast or broadcast services may be delivered using either an MRB or a dedicated radio bearer (DRB) for a UE in an RRC connected state. Using broadcast mode, multicast broadcast services may be delivered using an MRB for a UE in an RRC connected state, an RRC idle state, or an RRC inactive state.

In some cases, UEs in a wireless network, or UEs in a cell, may have different capabilities for multicast messages or broadcast messages (referred to herein as "multicast/broadcast messages"). For example, for a set of UEs in a cell, a first subset of the UEs may support a feature (or enhancement of a feature) for multicast/broadcast messages and a second subset of the UEs may not support the feature for multicast/broadcast messages. For example, a wireless communication standard, such as the 3GPP, may enable UEs to operate using one or more features for multicast/broadcast messages in accordance with a Release of the wireless communication standard. Future releases may add, or enable, additional features for UEs for multicast/broadcast messages. For example, UEs operating in accordance with a first Release (such as Release 17) may not support one or more features, whereas UEs operating in accordance with a second Release (such as Release 18) may support the one or more features or enhancements to one or more features. For example, for multicast or broadcast in NR, UEs operating in accordance with a first Release of the wireless communication standard may not support a radio link control (RLC) acknowledged mode (RLC-AM) for multicast/broadcast messages. UEs operating in accordance with the first Release of the wireless communication standard may only support an RLC unacknowledged mode (RLC-UM) for multicast/broadcast messages. However, UEs operating in accordance with a second Release of the wireless communication standard may support both the RLC-AM and the RLC-UM for multicast/broadcast messages. As another example, UEs operating in accordance with the first Release may not support forward error correction (or network coding procedures) for multicast/broadcast messages, whereas UEs operating in accordance with the second Release may support forward error correction for multicast/broadcast messages.

Multicast and broadcast services introduce additional complexity associated with ensuring forward compatibility for UEs operating in the wireless network. For example, a base station may transmit a multicast data stream or a broadcast data stream that is associated with a feature. However, some UEs that receive the multicast data stream or the broadcast data stream may not support the feature and may not be capable of receiving or decoding the multicast data stream or the broadcast data stream. Therefore, a base station may be required to transmit multiple multicast data streams or broadcast data streams to ensure that all UEs in the network are enabled to receive and decode a multicast message or a broadcast message. For example, a base station may need to transmit a first multicast/broadcast message using an RLC-AM format to enable a first set of UEs to operate in accordance with the RLC-AM (for UEs that support the RLC-AM for multicast/broadcast messages). Additionally, the base station may need to transmit a second multicast/broadcast message using an RLC-UM format to enable a second set of UEs to operate in accordance with the RLC-UM (for UEs that do not support the RLC-AM for multicast/broadcast messages). This adds additional complexity and signaling overhead associated with ensuring that UEs with different capabilities are enabled to receive the multicast/broadcast messages.

Figure 4:
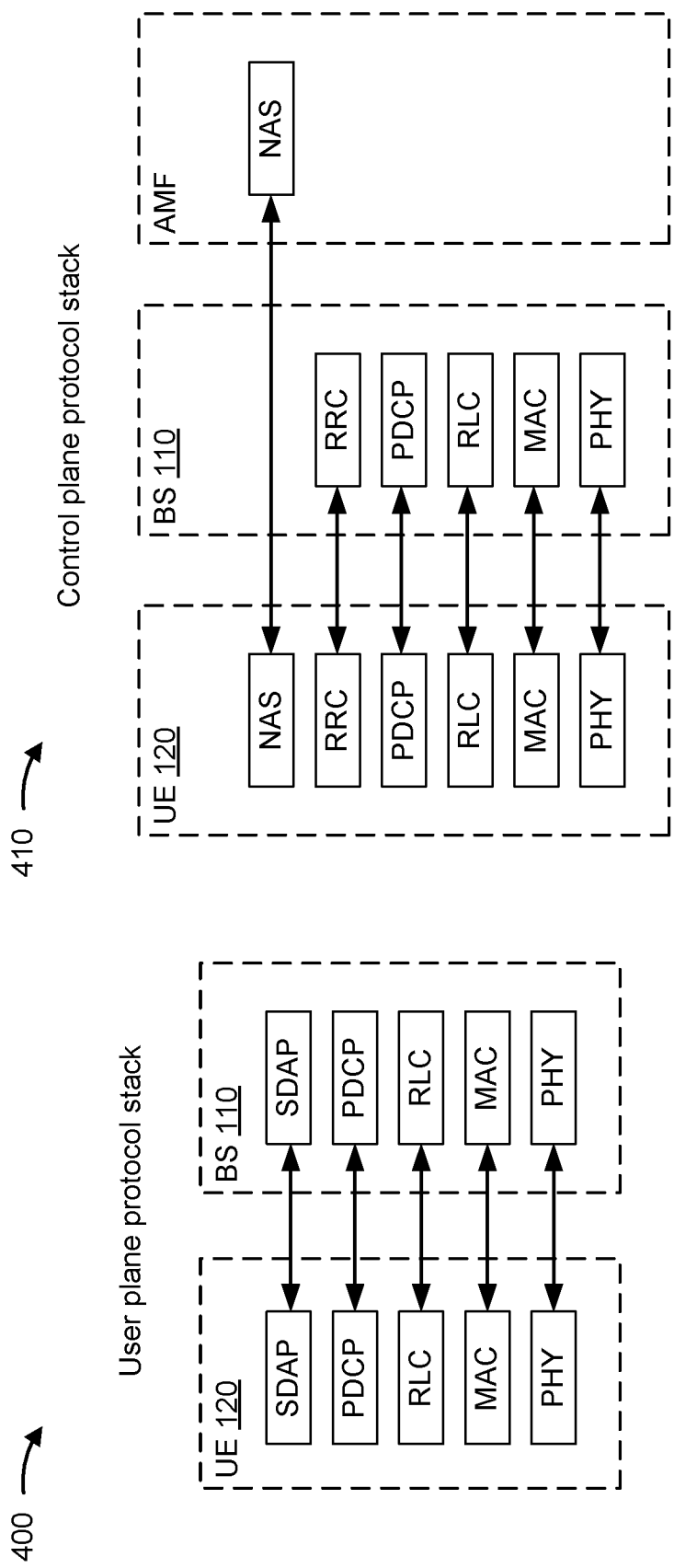
FIG. 4 is a diagram illustrating an example of a user plane protocol stack and a control plane protocol stack for a base station and a core network in communication with a UE, in accordance with the present disclosure.

FIG. 4 is a diagram illustrating an example of a user plane protocol stack 400 and a control plane protocol stack 410 for a base station 110 and a core network in communication with a UE 120, in accordance with the present disclosure. On the user plane, the UE 120 and the BS 110 may include respective physical (PHY) layers, medium access control (MAC) layers, RLC layers, packet data convergence protocol (PDCP) layers, and service data adaptation protocol (SDAP) layers.

A user plane function may handle transport of user data between the UE 120 and the BS 110. On the control plane, the UE 120 and the BS 110 may include respective RRC layers. Furthermore, the UE 120 may include a non-access stratum (NAS) layer in communication with a NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP, PDCP, RLC, and MAC layer may be referred to as higher than the PHY layer and lower than the RRC layer. An application (APP) layer, not shown in FIG. 4, may be higher than the SDAP, PDCP, RLC, and MAC layer. In some cases, an entity may handle the services and functions of a given layer (for example, a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (for example, handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (for example, if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some examples, the RRC or NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (for example, in accordance with a timer, as described elsewhere herein), PDCP re-establishment and data recovery for RLC-AM, and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (for example, if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

Figure 5:
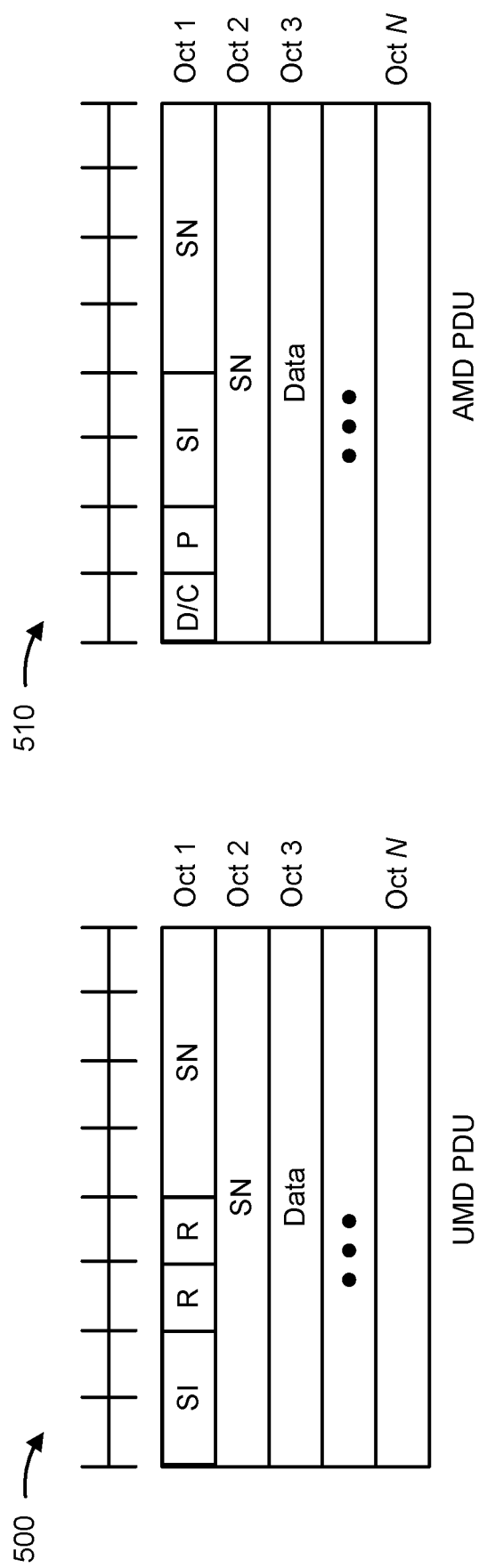
FIG. 5 is a diagram illustrating an example of a packet data unit (PDU) format for a radio link control (RLC)

FIG. 5 is a diagram illustrating an example of a PDU format 500 for an RLC-UM and a PDU format 510 for an RLC-AM, in accordance with the present disclosure. As shown in FIG. 5, the RLC-UM and the RLC-AM may use different PDU formats. For example, the PDU format 500 for the RLC-UM may depict a format for a UM data (UMD) PDU. The PDU format 510 for the RLC-AM may depict a format for an AM data (AMD) PDU. The PDU format 500 and the PDU format 510 are provided as examples and other examples are possible. For example, a wireless communication standard (such as 3GPP Technical Specification 38.322) may define, or otherwise fix, one or more PDU formats for UMD PDUs and one or more PDU formats for AMD PDUs.

In some cases, RLC may be associated with a transparent mode, the UM mode, or the AM mode. In the transparent mode, no RLC header is used for PDUs, buffering is performed at the transmitter RLC entity only, no segmentation or reassembly is used, and no feedback is provided by a receiver RLC entity (for example, no acknowledgement (ACK) or negative acknowledgement (NACK) feedback). In the UM, PDUs include an RLC header, buffering is performed at the transmitter RLC entity and the receiver RLC entity, segmentation and reassembly may be used, and no feedback is provided by a receiver RLC entity (for example, no ACK or NACK feedback). In the AM, PDUs include an RLC header, buffering is performed at the transmitter RLC entity and the receiver RLC entity, segmentation and reassembly may be used, and feedback may be provided by a receiver RLC entity (for example, ACK or NACK feedback may be provided by a receiver RLC entity).

For example, a UE 120 operating in accordance with the RLC-UM may not provide a reception response (such as ACK or NACK feedback) in response to receiving a PDU. A UE 120 operating in accordance with the RLC-AM may transmit a reception response (such as ACK or NACK feedback) in response to receiving a PDU. For example, the RLC-AM may enable a UE 120 to transmit a status PDU indicating RLC control information, such as ACK or NACK feedback for one or more RLC SDUs, for example. The RLC-AM may enable a UE 120 to poll a peer RLC entity in order to trigger status reporting at the peer RLC entity. For example, a UE 120 may transmit a PDU indicating a polling (using a field of an RLC header) of the receiving RLC entity. The receiving RLC entity may transmit a status PDU indicating RLC control information, such as ACK or NACK feedback, based on receiving the PDU indicating the polling. As described above, a UE 120 that is operating in accordance with the RLC-UM may not perform status reporting or polling procedures.

As shown in FIG. 5, the PDU format 500 for the RLC-UM (for example, for the UMD PDU) may include two bits for segmentation information (SI) in a first octet (Oct 1). SI may indicate if a data field of the PDU contains all bytes of an RLC SDU (for example, indicating segmentation is not used), if a data field of the PDU contains a first segment of an RLC SDU, if a data field of the PDU contains a last segment of an RLC SDU, or if a data field of the PDU contains neither the first segment nor the last segment of an RLC SDU. The PDU format 500 may include two reserved bits (shown as "R" in FIG. 5) in the first octet. The last four bits of the first octet for the PDU format 500 may be associated with a sequence number (SN) for the UMD PDU. As shown in FIG. 5, the PDU format 500 may use a 12 bit SN for the UMD PDU, such that all bits of a second octet (Oct 2) are associated with the SN. The remaining octets (Oct 3 through Oct N) of the PDU format 500 may be associated with data fields. In some cases, a PDU format for the RLC-UM may include fields for a sequence number only if segmentation is used.

The PDU format 510 for the RLC-AM (for example, for the AMD PDU) may include a bit indicating whether the PDU is for data information or control information (shown as "D/C" in FIG. 5) in a first octet (Oct 1). The bit indicating whether the PDU is for data information or control information may be referred to herein as a "D/C bit" or a "D/C indication," among other examples. The PDU format 510 may include a polling bit (shown as "P" in FIG. 5) in the first octet indicating whether polling is request for the PDU. The PDU format 510 may include two bits for SI in the first octet. The last four bits of the first octet for the PDU format 510 may be associated with a SN for the AMD PDU. As shown in FIG. 5, the PDU format 510 may use a 12 bit SN for the AMD PDU, such that all bits of a second octet (Oct 2) are associated with the SN. The remaining octets (Oct 3 through Oct N) of the PDU format 500 may be associated with data fields. An AMD PDU may always use a SN (in contrast with a UMD PDU that may not include a SN in some cases). Additionally, if segmentation is used, the PDU format 510 may include one or more fields associated with a segmentation offset. The segmentation offset fields may be used to indicate a position of the AMD PDU segment in bytes within an original RLC SDU.

Therefore, as shown in FIG. 5, formats for the RLC-AM and the RLC-UM may differ to support different features of the RLC-AM and the RLC-UM. For example, the PDU format 510 for the RLC-AM may include the bit indicating whether the AMD is for data or control information and the polling bit, whereas the PDU format 510 for the RLC-UM may not include the bit indicating whether the AMD is for data or control information and the polling bit (as this information is not relevant for the RLC-UM). Similarly, if segmentation is used, the PDU format 510 for the RLC-AM may include one or more fields associated with a segmentation offset. Conversely, if segmentation is not used, the PDU format 500 for the RLC-UM may not include fields associated with a segmentation offset. Moreover, although both the PDU format 500 and the PDU format 510 include fields associated with SI, the position of the SI fields within the PDU format 500 and the PDU format 510 are different. Therefore, a UE 120 that is not enabled or configured to operate in the RLC-AM may be unable to decode or recognize a PDU that uses the PDU format 510 (or another PDU format for the RLC-AM).

In some cases, if a UE 120 receives a PDU format where unknown fields or reserved fields are used (for example, where an unknown field or a reserved field includes a value of "1"), the UE 120 may discard or ignore the PDU (for example, in accordance with a wireless communication standard). Therefore, a UE 120 that does not support the RLC-AM may not be enabled to receive a message that uses the PDU format 510 for an AMD PDU (or another PDU format for the RLC-AM). As a result, if a UE 120 does not support the RLC-AM for multicast/broadcast messages, the UE 120 may not be enabled or capable of receiving a multicast/broadcast message that uses a format associated with the RLC-AM (such as the PDU format 510 or another PDU format for the RLC-AM). Therefore, if a base station 110 enables or configures the RLC-AM for a multicast/broadcast message, the base station 110 may need to transmit a first multicast/broadcast message that uses a format associated with the RLC-AM (to enable UEs 120 that support the RLC-AM for multicast/broadcast messages to operate in accordance with the RLC-AM for the multicast/broadcast message). Additionally, the base station 110 may need to transmit a second multicast/broadcast message (for example, indicating the same information as the first multicast/broadcast message) that uses a format associated with the RLC-UM (to enable UEs 120 that do not support the RLC-AM for multicast/broadcast messages to receive the second multicast/broadcast message and operate in accordance with the RLC-UM). This introduces additional complexity and signaling overhead associated with transmitting the same information in separate multicast messages or broadcast messages.

As another example, in some cases, a base station 110 may use network coding for a multicast/broadcast message. For example, in a network coding procedure an encoder (or transmitter) may encode data, such as a set of source packets or original packets, into a set of encoded packets using network coding. An encoded packet may be the same as a source packet, may be a redundancy version of a source packet, may include a combination of multiple source packets (for example, a subset of the source packets), or may include a redundancy version of the combination, among other examples. The encoder transmits the encoded packets to a decoder (or receiver). The decoder uses network coding to decode the encoded packets and recover the source packets. As used herein, network coding may be performed using any type of network coding scheme, such as fountain coding, linear network coding, random linear network coding, Luby transform (LT) network coding, or Raptor network coding, among other examples. For example, a base station 110 that uses network coding for a multicast/broadcast message may transmit one or more redundancy packets (or parity packets) for the multicast/broadcast message as part of the network coding procedure. However, a UE 120 that does not support network coding for multicast/broadcast messages may be unable to decode, or may not recognize, the redundancy packets (or parity packets) for the multicast/broadcast message. Therefore, the base station 110 may need to transmit multiple data streams for the multicast/broadcast message (for example, with one data stream that uses network coding and another data stream that does not use network coding). This introduces additional complexity and signaling overhead associated with transmitting the same information in separate multicast/broadcast messages.

Various aspects relate generally to RLC forward compatibility for multicast messages or broadcast messages. Some aspects more specifically relate to enabling a base station 110 to transmit a single multicast/broadcast data stream that enables a first UE 120 to operate in accordance with the RLC-UM for the single multicast/broadcast data stream and a second UE 120 to operate in accordance with the RLC-AM for the single multicast/broadcast data stream. In some aspects, the first UE 120 that does not support the RLC-AM for multicast/broadcast messages may be enabled to decode a multicast/broadcast message that uses a format associated with the RLC-AM. For example, the first UE 120 may identify and extract information associated with the RLC-UM in the multicast/broadcast message when the multicast/broadcast message uses a format associated with the RLC-AM. The first UE 120 may operate in accordance with the RLC-UM using the extracted information in the multicast/broadcast message. For example, the first UE may extract information associated with the RLC-UM (such as segmentation information or a sequence number) and may receive RLC packets from the base station in accordance with the RLC-UM (such as without providing feedback information that would otherwise be associated with the RLC-AM).

In some aspects, the first UE 120 may identify that the format associated with the RLC-AM is used for multicast/broadcast messages based at least in part on receiving an RRC configuration indicating that UEs 120 are to use the RLC-AM for multicast/broadcast messages. The first UE 120 may decode a multicast/broadcast message that uses a format associated with the RLC-AM, ignore the RRC configuration, and operate in accordance with the RLC-UM for the multicast/broadcast message that uses the format associated with the RLC-AM.

In some other aspects, the base station 110 may use a PDU format that is associated with multicast or broadcast services (MBS) or point-to-multipoint services (for example, an MBS PDU format). The MBS PDU format may include one or more reserved bits or one or more other bits associated with the RLC-AM. The first UE 120 that does not support the RLC-AM for multicast/broadcast messages may ignore the one or more reserved bits or one or more other bits associated with the RLC-AM and may be enabled to receive and decode the multicast/broadcast messages that uses the MBS PDU format to enable the UE 120 to operate in accordance with the RLC-UM for the multicast/broadcast messages. Similarly, the second UE 120 that does support the RLC-AM for multicast/broadcast messages may recognize and decode the bits associated with the RLC-AM to enable the second UE 120 to operate in accordance with the RLC-AM for the same multicast/broadcast messages that use the MBS PDU format.

In some other aspects, a base station 110 may be enabled to indicate whether a packet is associated with a network coding feature or a forward error correction feature using a reserved bit of an RLC header or a PDCP PDU format that indicates that a packet is a parity packet or a redundancy packet for the network coding feature or the forward error correction feature. In some other aspects, the base station 110 may be enabled to indicate whether a packet is associated with a network coding feature or a forward error correction feature using a RLC control PDU header consisting of a D/C field and a CPT field where the CPT field indicates that a packet is a parity packet or a redundancy packet for the network coding feature or the forward error correction feature. Therefore, UEs 120 that do not support the network coding feature or the forward error correction feature for multicast/broadcast messages may ignore or discard the packet associated with the network coding feature or the forward error correction feature (as a reserved bit or an unrecognized PDCP PDU format is used for the packet). Additionally, UEs 120 that do support the network coding feature or the forward error correction feature for multicast/broadcast messages may be enabled to recognize that the packet is associated with the network coding feature or the forward error correction feature (for example, based at least in part on the information conveyed via the reserved bit or the PDCP PDU format). Therefore, the UE 120 may receive or decode the packet to enable the UE 120 to operate in accordance with the network coding feature or the forward error correction feature for the multicast/broadcast message.

Particular aspects of the subject matter described in this disclosure can be implemented to realize one or more of the following potential advantages. In some examples, the described techniques can be used to enable a single multicast/broadcast message to support a first UE 120 that is not capable of supporting a feature or enhancement and a second UE 120 that is capable of supporting the feature or the enhancement. For example, a single multicast/broadcast data stream may enable a first UE 120 to operate in accordance with the RLC-UM for the single multicast/broadcast data stream and may enable a second UE to operate in accordance with the RLC-AM for the single multicast/broadcast data stream. Additionally or alternatively, a single multicast/broadcast data stream may enable a first UE 120 to discard parity packets or redundancy packets while still receiving the information included in the single multicast/broadcast data stream and may enable a second UE 120 to operate in accordance with a network coding feature or a forward error correction feature for the multicast/broadcast data stream. This conserves a signaling overhead that would have otherwise been used to transmit multiple multicast/broadcast messages to support a first UE that is not capable of supporting a feature or enhancement and a second UE that is capable of supporting the feature or enhancement within a cell or a wireless network. Moreover, this reduces a complexity associated with ensuring forward compatibility for RLC features associated with multicast/broadcast messages.

Figure 6A:
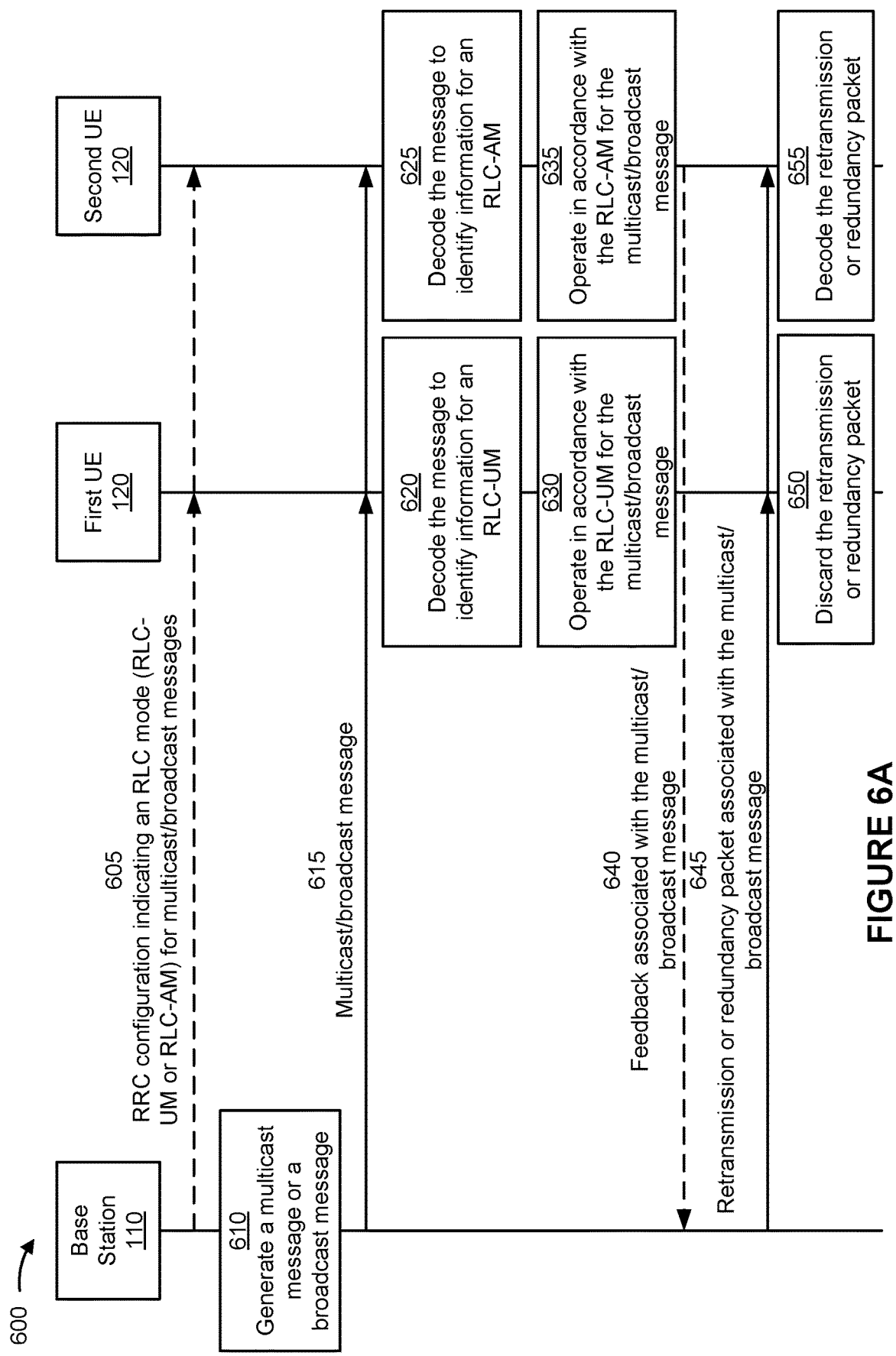

FIGS. 6A-6E are diagram illustrating an example associated with RLC forward compatibility 600 for multicast messages or broadcast messages, in accordance with the present disclosure. As shown in FIG. 6A, a base station 110 and one or more UEs 120 may communicate with each another. For example, the base station 110 may communicate with a first UE 120 and a second UE 120. In some aspects, the base station 110, the first UE 120, and the second UE 120 may be included in a wireless network, such as the wireless network 100. In some aspects, the first UE 120 may be associated with a first capability for multicast/broadcast messages and the second UE 120 may be associated with a second capability for multicast/broadcast messages. For example, the first UE 120 may operate in accordance with a first release of a wireless communication standard and the second UE 120 may operate in accordance with a second release of the wireless communication standard (where the second release enables the second UE 120 to operate in accordance with a different capability of the first UE 120).

For example, in some aspects, the first UE 120 may only support (or may be only capable of operating in accordance with) an RLC-UM for multicast/broadcast messages. The second UE 120 may support both (or may be capable of operating in accordance with both) the RLC-UM and the RLC-AM for multicast/broadcast messages. As another example, the first UE 120 may not support (or may not be capable of operating in accordance with) a network coding feature or a forward error correction feature for multicast/broadcast messages. Conversely, the second UE 120 may support (or may be capable of operating in accordance with) the network coding feature or the forward error correction feature for multicast/broadcast messages. While examples described herein are described in connection with enabling second UE 120 to operate in accordance with the RLC-AM and the first UE 120 to operate in accordance with the RLC-UM for the same multicast/broadcast message, the operations and techniques described herein may be used to enable the second UE 120 to operate in accordance with any feature or capability that is not supported by the first UE 120 using the same multicast/broadcast message (while still enabling the first UE 120 to receive and decode the multicast/broadcast message). Moreover, as used herein a capability "indicating" a feature or enhancement that is supported by a UE 120 does not necessarily refer to the UE 120 reporting or transmitting the capability to the base station 110. For example, in some aspects, the first UE 120 and the second UE 120 may not transmit or report any of the capabilities described above to the base station 110. For example, in some aspects, a UE 120 (the first UE 120 or the second UE 120) may not transmit an indication of a capability of the UE 120 to the base station 110. In some other aspects, the UE 120 (the first UE 120 or the second UE 120) may transmit an indication of a capability of the UE 120 to the base station 110.

In a first operation 605, in some aspects, the base station 110 may transmit (for example, broadcast) an RRC configuration indicating an RLC mode (for example, RLC-UM or RLC-AM) that UEs 120 are to use for multicast/broadcast messages transmitted by the base station 110. For example, the RRC configuration may indicate that UEs 120 located within the cell associated with the base station 110 are to use the RLC-AM for multicast/broadcast messages transmitted by the base station 110. In some aspects, the second UE 120 (that is capable of operating in accordance with either the RLC-AM or the RLC-UM for multicast/broadcast messages) may receive the RRC configuration and may operate in accordance with the RLC mode indicated by the RRC configuration. In some other aspects, such as where only an RLC-AM format is used by the base station 110 for multicast/broadcast messages, if the RRC configuration indicates that the RLC-UM is to be used for multicast/broadcast messages, the second UE 120 may identify that fields associated with the RLC-AM are to be ignored by the UE 120 for multicast/broadcast messages transmitted by the base station 110.

In some aspects, the first UE 120 (that is only capable of operating in accordance with the RLC-UM for multicast/broadcast messages) may receive the RRC configuration. If the RRC configuration indicates that the first UE 120 is to operate in accordance with the RLC-AM, the UE 120 may identify or determine that a format associated with the RLC-AM is to be used by the base station 110 for multicast/broadcast messages. As described in more detail herein, the first UE 120 may ignore or disregard the RRC configuration that indicates the first UE 120 is to operate in accordance with the RLC-AM and may operate in the RLC-UM for multicast/broadcast messages transmitted by the base station 110. In other words, the first UE 120 may use the RRC configuration as an indication that the format associated with the RLC-AM is to be used for multicast/broadcast messages to enable the UE 120 to properly receive and decode the multicast/broadcast messages (and operate in accordance with the RLC-UM), as described in more detail herein.

In a second operation 610, the base station 110 may generate a multicast/broadcast message using a format associated with the RLC-AM. For example, the base station 110 may generate the multicast/broadcast message using the format associated with the RLC-AM to enable the second UE 120 (or other UEs 120 that are capable of supporting the RLC-AM for multicast/broadcast messages) to operate in accordance with the RLC-AM for the multicast/broadcast message. In some aspects, the format may be a format associated with AMD PDUs for multicast/broadcast messages. For example, the multicast/broadcast message generated by the base station 110 (in the second operation 610) may include an RLC header that indicates information associated with the RLC-UM (for example, SI or a sequence number) and the RLC-AM (for example, a D/C bit and a polling bit).

In some other aspects, the format may be a format associated with MBS or point-to-multipoint services. For example, the format may be an RLC PDU format associated with an MRB, an MBS, or point-to-multipoint services (referred to herein as an "NBS format"). The NBS format may include one or more reserved bits or one or more other bits associated with the RLC-AM (for example, for indicating D/C information or a polling indication). The first UE 120 and the second UE 120 may be configured to support the MBS format. As described in more detail herein, the first UE 120 may be configured to ignore or disregard the one or more reserved bits or one or more other bits associated with the RLC-AM. Therefore, the first UE 120 may be enabled to receive information from the RLC PDUs using MBS format and may operate in accordance with the RLC-UM for the multicast/broadcast message that uses the MBS format. Additionally, the second UE 120 may be configured to recognize and extract information from the one or more reserved bits or one or more other bits associated with the RLC-AM. As a result, the second UE 120 may be enabled to receive information from the MBS format associated with the RLC-AM and may operate in accordance with the RLC-AM for the multicast/broadcast message that uses the MBS format. In some aspects, the MBS format may include an indication of whether the RLC-AM or the RLC-UM is to be used for the PDU. Therefore, the first UE 120 and the second UE 120 may be enabled to identify the RLC mode associated with the PDU (for example, without requiring an RRC configuration).

In a third operation 615, the base station 110 may transmit the multicast/broadcast message that uses the format associated with the RLC-AM. For example, the multicast/broadcast message may be a multicast message to a group of UEs 120 that includes the first UE 120 and the second UE 120 (or one or more other UEs 120 not depicted in FIG. 6A). In some other aspects, the multicast/broadcast message may be a broadcast message and the first UE 120 and the second UE 120 may be located in an area associated with a cell of the base station 110, such that the first UE 120 and the second UE 120 are enabled to receive the broadcast message. For example, the first UE 120 and the second UE 120 may receive the multicast/broadcast message that uses the format associated with the RLC-AM. As described above, the base station 110 may transmit the multicast/broadcast message using a format associated with the RLC-AM. For example, the multicast/broadcast message may use an RLC format associated with an AMD PDU for multicast/broadcast messages. In some other aspects, the multicast/broadcast message may use the MBS format (for example, an RLC PDU format for MBS).

In a fourth operation 620, the first UE 120 may decode the multicast/broadcast message to identify information associated with the RLC-UM. For example, based at least in part on a capability of the first UE 120 (such as a capability that the first UE 120 does not support the RLC-AM for multicast/broadcast messages), the first UE 120 may decode the multicast/broadcast message (that uses the format associated with the RLC-AM) to identify information associated with the RLC-UM. For example, in some aspects, the first UE 120 may be capable of supporting formats associated with both the RLC-UM and the RLC-AM (while only support RLC-UM procedures for multicast/broadcast messages). In some other aspects, the first UE 120 may only be capable of supporting the format(s) associated with the RLC-AM (while only support RLC-UM procedures for multicast/broadcast messages). In some other aspects, the first UE 120 may support the MBS format (for example, the RLC PDU format for MBS).

For example, if the multicast/broadcast message uses a format associated with the RLC-AM, the first UE 120 may be enabled to identify or understand the format, such that the UE 120 is capable of identifying a location of information in the multicast/broadcast message (such as in an RLC header of the multicast/broadcast message). For example, the first UE 120 may be enabled to identify information that is associated with or applicable to the RLC-UM in the multicast/broadcast message that uses the format associated with the RLC-AM. The first UE 120 may extract the information that is associated with or applicable to the RLC-UM from the multicast/broadcast message. For example, in the fourth operation 620, the first UE 120 may extract SI or a SN from the multicast/broadcast message based at least in part on identifying the SI and the SN in the multicast/broadcast message. In some aspects, in the fourth operation 620, the first UE 120 may ignore or disregard fields or information in the multicast/broadcast message that is associated with the RLC-AM. For example, the first UE 120 may ignore or disregard a field or information associated with polling information or segmentation offset information, among other examples. In another example, the UE 120 may use a D/C indication to determine whether the packet is a data or control packet but may ignore or disregard one or more fields or information associated with RLC-AM in the multicast/broadcast message. As a result, in the fourth operation 620, the first UE 120 may be enabled to decode and extract information from the multicast/broadcast message (that uses the format associated with the RLC-AM) to enable the first UE 120 to operate in accordance with the RLC-UM for the multicast/broadcast message. Moreover, as the first UE 120 may be configured to recognize or understand the format associated with the RLC-AM, the first UE 120 may not automatically discard or ignore the multicast/broadcast message.

In some other aspects, if the multicast/broadcast message uses the RLC PDU format associated with the MBS, then the first UE 120 may ignore or disregard fields in the RLC PDU format associated with the MBS that are not applicable for the RLC-UM. For example, in the fourth operation 620, the first UE 120 may ignore or disregard one or more reserved fields or one or more fields associated with the RLC-AM in a header of the multicast/broadcast message that uses the RLC PDU format associated with the MBS. For example, the one or more reserved fields or the one or more fields associated with the RLC-AM may be used to indicate information associated with the RLC-AM, such as polling information, a D/C indication, or segmentation offset information, among other examples. Therefore, the first UE 120 may decode the multicast/broadcast by identifying and extracting information associated with the RLC-UM (such as SI or a SN) from the RLC PDU format associated with the MBS, while ignoring or disregarding information associated with the RLC-AM (such as a polling indicator or segmentation offset information, among other examples).

In a fifth operation 625, the second UE 120 may decode the multicast/broadcast message to identify information associated with the RLC-AM. For example, because the second UE 120 may be capable of supporting the RLC-AM for multicast/broadcast messages, the second UE 120 may decode the multicast/broadcast message to identify information associated with the RLC-AM. For example, the second UE 120 may support the RLC-AM format as the second UE 120 is capable of operating in accordance with the RLC-AM for multicast/broadcast messages. Therefore, if the multicast/broadcast message (for example, using a bit field of the multicast/broadcast message) or an RRC configuration indicates that the second UE 120 is to operate in accordance with the RLC-AM, then the second UE 120 may decode the multicast/broadcast message to identify information associated with the RLC-AM.

In some aspects, where the base station 110 only uses a format associated with the RLC-AM and an RRC configuration indicates that the second UE 120 is to operate in the RLC-UM, the second UE 120 may decode the multicast/broadcast message to identify information associated with the RLC-UM in a similar manner as described above in connection with the fourth operation 620 and the first UE 120. For example, the second UE 120 may ignore one or more fields in the multicast/broadcast message associated with the RLC-AM and may extract information associated to the RLC-UM to enable the second UE 120 to operate in the RLC-UM. In some other aspects, if the multicast/broadcast message uses the RLC PDU format associated with the MBS and an RRC configuration indicates that the second UE 120 is to operate in the RLC-UM, then the second UE 120 may decode the multicast/broadcast by identifying and extracting information associated with the RLC-UM (such as SI or a SN) from the RLC PDU format associated with the MBS, while ignoring or disregarding information associated with the RLC-AM (such as a polling indicator or segmentation offset information, among other examples). This may enable the second UE 120 to operate in either the RLC-AM or the RLC-UM (for example, depending on an RRC configuration or an indication in the multicast/broadcast message) while also enabling the first UE 120 to operate in the RLC-AM for the same multicast/broadcast data stream.

In a sixth operation 630, the first UE 120 may operate in accordance with the RLC-UM for the multicast/broadcast message. For example, based at least in part on decoding the multicast/broadcast message to identify the information associated with the RLC-UM (in the fourth operation 620), the first UE 120 may be enabled to operate in accordance with the RLC-UM for the multicast/broadcast message. For example, if an RRC configuration indicates that UEs 120 associated with the base station 110 are to operate in accordance with the RLC-AM for multicast/broadcast messages, the first UE 120 may use the RRC configuration as an indication that the format associated with the RLC-AM is to be used by the base station 110. The first UE 120 may decode the multicast/broadcast message to identify the information associated with the RLC-UM based at least in part on identifying that the format associated with the RLC-AM is to be used by the base station 110. The first UE 120 may operate in accordance with the RLC-UM, regardless of the RRC configuration. In other words, the first UE 120 may ignore or disregard the RRC configuration indicating that the first UE 120 is to operate in accordance with the RLC-AM and may operate in accordance with the RLC-UM for the multicast/broadcast message.

In a seventh operation 635, the second UE 120 may operate in accordance with the RLC-AM for the multicast/broadcast message. For example, based at least in part on decoding the multicast/broadcast message to identify the information associated with the RLC-AM (in the fifth operation 625), the second UE 120 may be enabled to operate in accordance with the RLC-AM for the multicast/broadcast message. For example, if an RRC configuration indicates that UEs 120 associated with the base station 110 are to operate in accordance with the RLC-AM for multicast/broadcast messages, the second UE 120 may receive, decode, and operate in accordance with the RLC-AM for the multicast/broadcast message.

As a result, the first UE 120 may be enabled to operate in accordance with the RLC-UM and the second UE 120 may be enabled to operate in accordance with the RLC-AM for the same multicast/broadcast message.

For example, in an eighth operation 640, the second UE 120 may transmit, to the base station 110, feedback information (ACK or NACK feedback) for the multicast/broadcast message. For example, if the multicast/broadcast message includes an indication requesting polling (such as using a polling indicator field in an RLC header of the multicast/broadcast message), then the second UE 120 may transmit feedback information (ACK or NACK feedback) for the multicast/broadcast message to the base station 110 in accordance with the RLC-AM.

In a ninth operation 645, the base station 110 may transmit one or more retransmissions of the previously transmitted RLC PDUs, or redundancy packets associated with the multicast/broadcast message in accordance with a network coding feature or a forward error correction feature, or a combination thereof. In some aspects, the first UE 120 or the second UE 120 may determine that a packet is associated with a retransmission based at least in part on the packet using an SN that is associated with a previously transmitted packet (for example, an indication that a packet is a retransmission may be that the same SN is included in a header of the packet as a previous packet). In some aspects, the base station 110 may use a reserved field of an RLC header to indicate that the packet is a redundancy packet for a network coding feature or a forward error correction feature. For example, the base station 110 may use a reserved field of an existing PDU format to indicate that the packet is a redundancy packet (for example, a parity packet) for a network coding feature or a forward error correction feature. For example, the base station 110 (or a wireless communication standard) may define or indicate that a reserved field of an existing PDU format is to be used to indicate that the packet is a redundancy packet for a multicast/broadcast data stream. In some other aspects, the base station 110 may be enabled to indicate whether a packet is associated with a network coding feature or a forward error correction feature using an RLC control PDU header that may include a D/C field and a Control PDU Type (CPT) field, where the CPT field indicates that a packet is a parity packet or a redundancy packet for the network coding feature or the forward error correction feature.

As described above, the first UE 120 may be enabled to operate in the RLC-UM. Additionally, in a tenth operation 650, as a reserved field is used to indicate that the packet is a parity packet, the first UE 120 may discard or drop the packet. The first UE 120 may continue to receive other packets and operate in accordance with the RLC-UM, as described above. However, in an eleventh operation 655, the second UE 120 may be enabled to recognize that a packet is a retransmission, or recognize indication of the redundancy or parity packet in the reserved field (for example, based at least in part on a capability of the second UE 120). Therefore, the second UE 120 may receive the retransmission packet and decode it, or receive a redundancy or parity packet and may perform network decoding to enable the second UE 120 to operate in accordance with the network coding feature or the forward error correction feature for the multicast/broadcast message. For example, a procedure may be defined to enable the second UE 120 to operate in accordance with the network coding feature or the forward error correction feature for the multicast/broadcast message. For example, a first M bytes of data in the redundancy or parity packet may indicate which SNs that the parity bits correspond to as described below.

In some other aspects, the one or more redundancy packets associated with the multicast/broadcast message in accordance with a network coding feature or a forward error correction feature in the ninth operation 645 may use a PDCP PDU format to indicate that the packet(s) are redundancy or parity packets. In the tenth operation 650, the first UE 120 may discard or drop the packet(s) as the first UE 120 may not be enabled to recognize or understand the PDCP PDU format. In the eleventh operation 655, the second UE 120 may be enabled to recognize or understand the PDCP PDU format. Therefore, the second UE 120 may receive and perform network decoding using the packet(s) that use the PDCP PDU format associated with redundancy or parity packets for multicast/broadcast messages.

In some aspects, the use of redundancy packets or parity packets may cause gaps or holes in SNs used by the base station 110 for the multicast/broadcast message. For example, if a multicast/broadcast message is associated with 10 original packets and 2 parity (redundancy) packets, the first UE 120 may receive the first 10 original packets, but there may be a SN gap caused by the 2 parity packets (as the first UE 120 may not receive or may discard the 2 parity packets, as described above). Therefore, if the network coding feature or the forward error correction feature is used for the multicast/broadcast message, then the first UE 120 may be configured to operate in accordance with the RLC-UM for the multicast/broadcast message (even if the first UE 120 is capable of supporting the RLC-AM). For example, as the first UE 120 may not be capable or enabled to receive the parity packets, the first UE 120 should be configured to operate in accordance with the RLC-UM to mitigate the issues cause the SN gap or hole caused by the parity packets.

Moreover, the use of redundancy packets or parity packets may cause gaps or holes in SNs for the second UE 120 that does support the network coding feature or the forward error correction feature. For example, if the second UE 120 successfully receives all the original packets after the first parity packet is received, then the second UE 120 may not receive or decode the second parity packet transmitted by the base station 110. Therefore, a SN gap may be caused for the second UE 120 by not receiving or decoding the second parity packet. Therefore, in some aspects, the PDCP PDU format associated with redundancy or parity packets for multicast/broadcast messages may include a field indicating a PDCP SN range associated with the packet. For example, rather than include a SN for the PDCP PDU, the base station 110 may generate the parity packet an include an indication of the PDCP SNs associated with the parity packet. For example, if the parity packet is associated with PDCP SNs 1 to 10, then the field in the PDCP PDU may indicate that the packet is associated with PDCP SNs 1 to 10 (rather than indicate a PDCP SN for the parity packet). Therefore, the second UE 120 may be enabled to identify that the packet is a parity packet for the multicast/broadcast message and may also mitigate the issues caused by SN gaps or holes. For example, the second UE 120 may avoid determining that a packet is not successfully received (and therefore transmitting NACK feedback or requesting a retransmission of the packet) as would have otherwise occurred if the second UE 120 identified a gap or hole in the PDCP SNs received by the second UE 120.

Figure 6B:
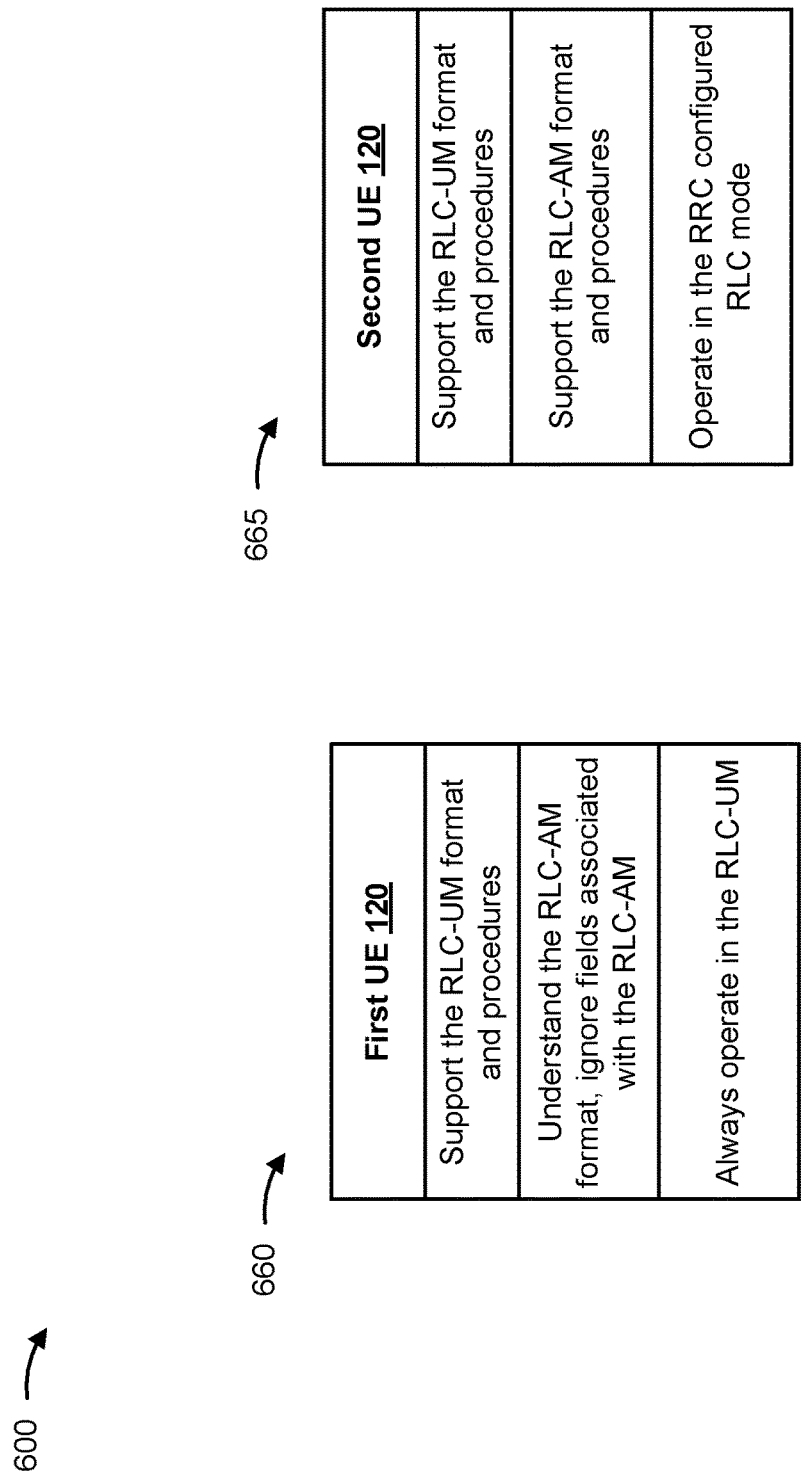

FIGS. 6B-6E indicate configurations or operations to be performed by the first UE 120 and the second UE 120 for the same multicast/broadcast message. As shown in FIG. 6B, the first UE 120 may operate in accordance with a configuration 660 for the multicast/broadcast message. For example, the first UE 120 may only support RLC-UM procedures for multicast/broadcast messages. The first UE 120 may be configured to support RLC-UM formats and RLC-AM formats for multicast/broadcast messages. As described in more detail elsewhere herein, if the RLC-AM format is used for the multicast/broadcast message, the first UE 120 may decode the multicast/broadcast message by identifying and extracting information associated with the RLC-UM and may ignore or disregard fields associated with the RLC-AM. Therefore, the first UE 120 may always operate in the RLC-UM, regardless of whether the RLC-UM format or the RLC-AM format is used for the multicast/broadcast message. The second UE 120 may operate in accordance with a configuration 665 for the multicast/broadcast message. For example, the second UE 120 may support RLC-UM formats and procedures for multicast/broadcast messages. Additionally, the second UE 120 may support RLC-AM formats and procedures for multicast/broadcast messages. Therefore, the second UE 120 may operate in an RLC mode indicated by an RRC configuration.

Figure 6C:
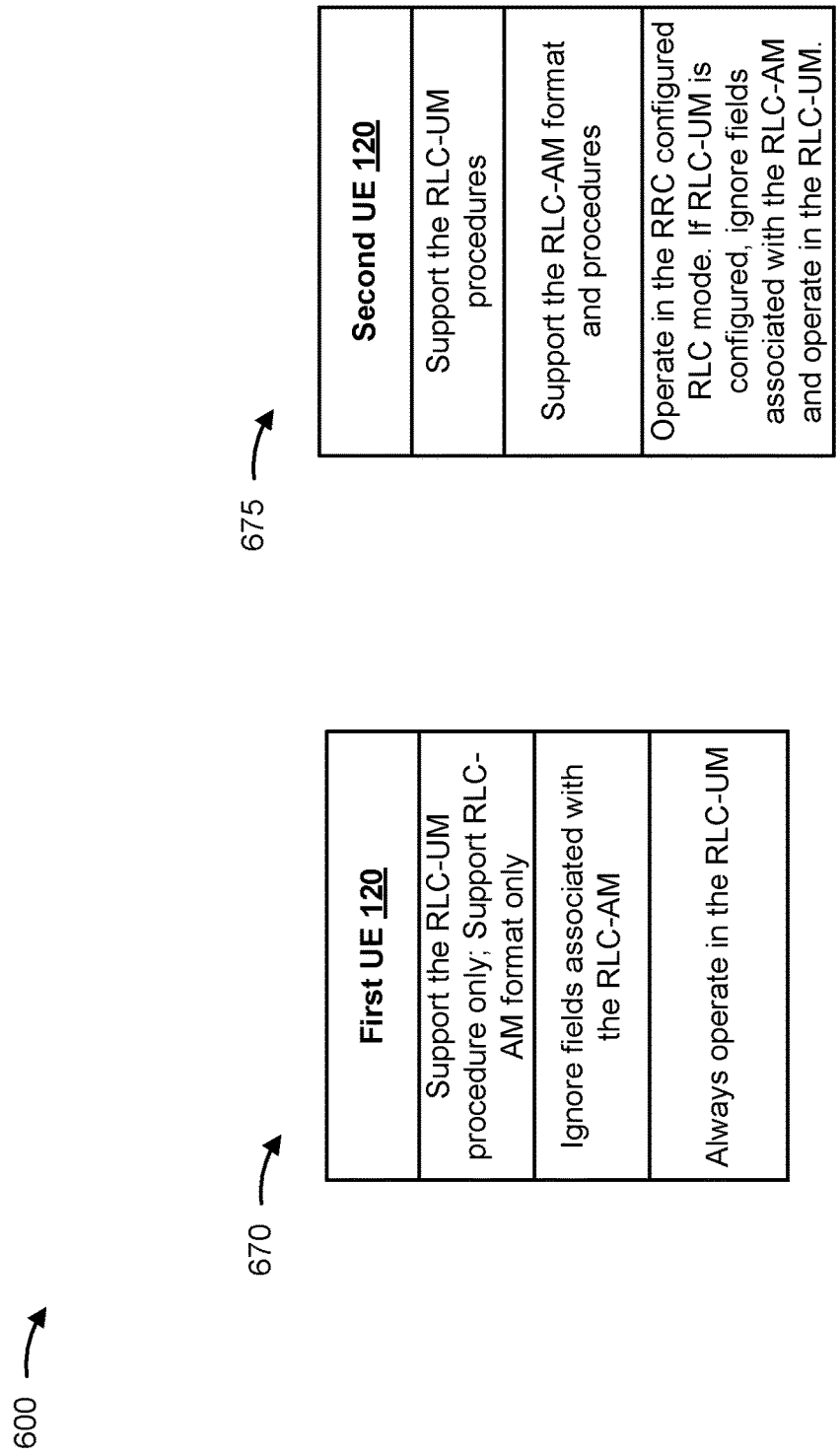

In some other aspects, as shown in FIG. 6C, the first UE 120 may operate in accordance with a configuration 670 for the multicast/broadcast message. In the configuration 670, the first UE 120 may only support RLC-UM procedures for multicast/broadcast messages (and not RLC-AM procedures) but may support only RLC-AM formats for multicast/broadcast messages (and not RLC-UM formats). This may reduce a complexity associated with configuring the first UE 120 as the first UE 120 (and the second UE 120) may not need to recognize or understand multiple RLC formats for multicast/broadcast messages. As described in more detail elsewhere herein, the first UE 120 may decode multicast/broadcast messages by identifying and extracting information associated with the RLC-UM from the multicast/broadcast messages and may ignore or disregard fields associated with the RLC-AM in the multicast/broadcast messages. Therefore, the first UE 120 may always operate in the RLC-UM for multicast/broadcast messages, even if the RLC-AM format is used. The second UE 120 may operate in accordance with a configuration 675 for the multicast/broadcast message. For example, the second UE 120 may support both RLC-AM and RLC-UM procedures for multicast/broadcast messages but may support only RLC-AM formats for multicast/broadcast messages (and not RLC-UM formats). If an RRC configuration indicates that the RLC-AM is to be used, the second UE 120 may be enabled to operate in accordance with the RLC-AM for the multicast/broadcast message (whereas the first UE 120 operates in accordance with the RLC-UM for the same multicast/broadcast message). However, as only an RLC-AM format may be used by the base station 110, if an RRC configuration indicates that the RLC-UM is to be used, the second base station 110 may decode multicast/broadcast messages by identifying and extracting information associated with the RLC-UM from the multicast/broadcast message and may ignore or disregard fields associated with the RLC-AM in the multicast/broadcast message to enable the second UE 120 to operate in the RLC-UM.

Figure 6D:
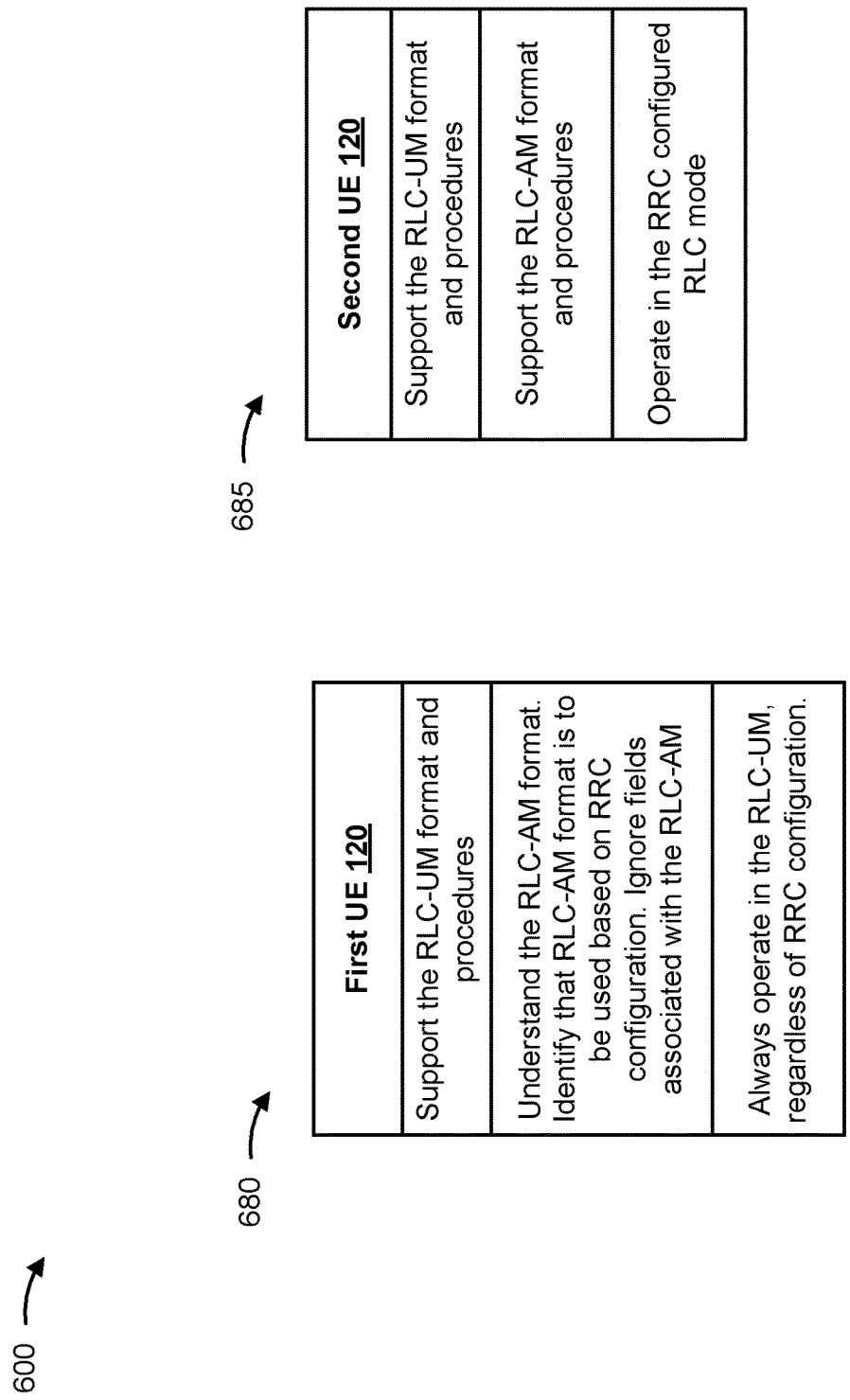

In some other aspects, as shown in FIG. 6D, the first UE 120 may operate in accordance with a configuration 680 for the multicast/broadcast message. For example, the first UE 120 may only support RLC-UM procedures for multicast/broadcast messages. The first UE 120 may be configured to support RLC-UM formats and RLC-AM formats for multicast/broadcast messages. As described in more detail elsewhere herein, the first UE 120 may identify that the RLC-AM format is to be used for the multicast/broadcast message based at least in part on receiving an RRC configuration that configures UEs 120 to use the RLC-AM for multicast/broadcast messages. Therefore, the first UE 120 may be enabled to decode multicast/broadcast messages by identifying and extracting information associated with the RLC-UM from the multicast/broadcast messages and may ignore or disregard fields associated with the RLC-AM in the multicast/broadcast messages. Therefore, the first UE 120 may always operate in the RLC-UM for multicast/broadcast messages, even if the RRC configuration indicates that UEs 120 are to use the RLC-AM for multicast/broadcast messages. The second UE 120 may operate in accordance with a configuration 685 for the multicast/broadcast message. For example, the second UE 120 may support RLC-UM formats and procedures for multicast/broadcast messages. Additionally, the second UE 120 may support RLC-AM formats and procedures for multicast/broadcast messages. Therefore, the second UE 120 may operate in an RLC mode indicated by an RRC configuration.

Figure 6E:
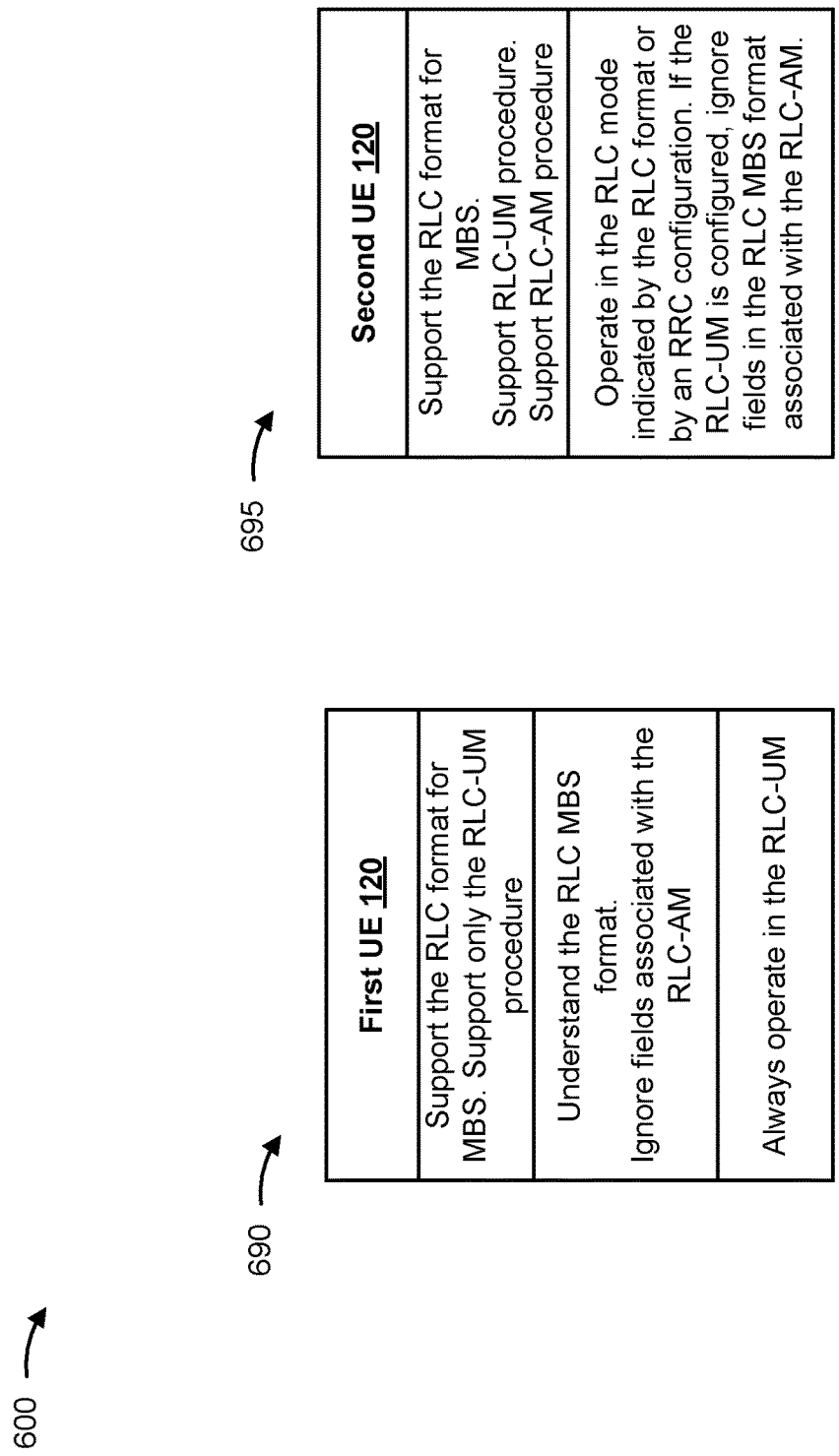

In some other aspects, as shown in FIG. 6E, an RLC PDU format for MBS or point-to-multipoint services may be used for the multicast/broadcast message. The first UE 120 may operate in accordance with a configuration 690 for the multicast/broadcast message. For example, the first UE 120 may support the RLC PDU format for MBS or point-to-multipoint services. The first UE may support only RLC-UM procedures (and not RLC-AM procedures) for multicast/broadcast messages. For example, the first UE 120 may recognize or understand the RLC PDU format for MBS or point-to-multipoint services. The first UE 120 may decode the multicast/broadcast message by ignoring or disregarding fields in the RLC PDU format for MBS or point-to-multipoint services that are reserved or that are associated with the RLC-AM. Therefore, the first UE 120 may be enabled to always operate in the RLC-UM for the multicast/broadcast message. The second UE 120 may operate in accordance with a configuration 695 for the multicast/broadcast message. For example, the second UE 120 may support the RLC PDU format for MBS or point-to-multipoint services. Additionally, the second UE 120 may support the RLC-AM and the RLC-UM for multicast/broadcast messages. Therefore, the second UE 120 may operate in a RLC mode indicated by the multicast/broadcast message (for example, in a field of the RLC PDU format for MBS or point-to-multipoint services) or in the RLC mode indicated by an RRC configuration. For example, if the second UE 120 is to operate in the RLC-UM, then the second UE 120 may decode the multicast/broadcast message by ignoring or disregarding fields in the RLC PDU format for MBS or point-to-multipoint services that are reserved or that are associated with the RLC-AM.

As a result, using one or more of the operations or configurations described herein, UEs 120 that have different capabilities may be enabled to operate in accordance with the different capabilities for the same multicast/broadcast data stream. For example, the first UE 120 may be enabled to operate in accordance with the RLC-UM and the second UE 120 may be enabled to operate in accordance with the RLC-AM for the same multicast/broadcast data stream. This may reduce a complexity and reduce a signaling overhead associated with ensuring forward compatibility for RLC in multicast/broadcast messages.

FIG. 7 is a flowchart illustrating an example process 700 performed, for example, by a UE in accordance with the present disclosure. Example process 700 is an example where the UE (for example, a UE 120, such as the first UE 120 or the second UE 120 described in connection with FIGS. 6A-6E) performs operations associated with RLC forward compatibility for multicast messages or broadcast messages.

As shown in FIG. 7, in some aspects, process 700 may include receiving, from a base station, a multicast message or a broadcast message that uses an RLC format associated with an RLC-AM (block 710). For example, the UE (such as by using reception component 902, depicted in FIG. 9) may receive, from a base station, a multicast message or a broadcast message that uses an RLC format associated with an RLC-AM, as described above.

As further shown in FIG. 7, in some aspects, process 700 may include decoding the multicast message or the broadcast message to identify information associated with an RLC-UM based at least in part on a capability of the UE (block 720). For example, the UE (such as by using decoding component 910, depicted in FIG. 9) may decode the multicast message or the broadcast message to identify information associated with an RLC unacknowledged mode (RLC-UM) based at least in part on a capability of the UE, as described above.

As further shown in FIG. 7, in some aspects, process 700 may include operating in accordance with the RLC-UM based at least in part on decoding the multicast message or the broadcast message (block 730). For example, the UE (such as by using reception component 902 or transmission component 906, depicted in FIG. 9) may operate in accordance with the RLC-UM based at least in part on decoding the multicast message or the broadcast message, as described above.

Process 700 may include additional aspects, such as any single aspect or any combination of aspects described below or in connection with one or more other processes described elsewhere herein.

In a first additional aspect, the UE supports the RLC format associated with the RLC-AM and a different RLC format associated with the RLC-UM, and the UE is capable of operating only in accordance with the RLC-UM for multicast messages or broadcast messages.

In a second additional aspect, alone or in combination with the first aspect, the UE supports only the RLC format associated with the RLC-AM, and the UE is capable of operating only in accordance with the RLC-UM for multicast messages or broadcast messages.

In a third additional aspect, alone or in combination with one or more of the first and second aspects, decoding the multicast message or the broadcast message includes identifying one or more fields associated with the RLC-AM in the multicast message or the broadcast message, and decoding the multicast message or the broadcast message based at least in part on extracting information associated with the RLC-UM from one or more other fields of the multicast message or the broadcast message and ignoring the one or more fields associated with the RLC-AM.

In a fourth additional aspect, alone or in combination with one or more of the first through third aspects, operating in accordance with the RLC-UM includes operating in accordance with the RLC-UM based at least in part on extracting the information from one or more fields of the multicast message or the broadcast message associated with the RLC-UM.

In a fifth additional aspect, alone or in combination with one or more of the first through fourth aspects, the UE is capable of operating in accordance with the RLC-AM or the RLC-UM for multicast messages or broadcast messages, and process 700 includes receiving an RRC configuration indicating that the UE is to operate in accordance with the RLC-UM for multicast messages or broadcast messages, and decoding the multicast message or the broadcast message includes decoding the multicast message or the broadcast message based at least in part on extracting information associated with the RLC-UM from one or more other fields of the multicast message or the broadcast message and ignoring the one or more fields associated with the RLC-AM.

In a sixth additional aspect, alone or in combination with one or more of the first through fifth aspects, process 700 includes receiving, from the base station, an RRC configuration that indicates that the RLC-AM is to be used for multicast messages or broadcast messages, and decoding the multicast message or the broadcast message includes decoding the multicast message or the broadcast message based at least in part on receiving the RRC configuration indicating that the RLC format associated with the RLC-AM is to be used by the base station, and operating in accordance with the RLC-UM includes operating in accordance with the RLC-UM based at least in part on decoding the multicast message or the broadcast message.

In a seventh additional aspect, alone or in combination with one or more of the first through sixth aspects, process 700 includes receiving, from the base station, an RRC configuration that indicates that the RLC-AM is to be used for multicast messages or broadcast messages, and decoding the multicast message or the broadcast message includes decoding the multicast message or the broadcast message based at least in part on ignoring one or more fields associated with the RLC-AM in the multicast message or the broadcast message.

In an eighth additional aspect, alone or in combination with one or more of the first through seventh aspects, the RLC format associated with the RLC-AM is an RLC PDU format for an MRB, and receiving the multicast message or the broadcast message includes receiving the multicast message or the broadcast message, using the RLC PDU format for the MRB, that includes one or more reserved fields or one or more fields associated with the RLC-AM in a header of the multicast message or the broadcast message.

In a ninth additional aspect, alone or in combination with one or more of the first through eighth aspects, decoding the multicast message or the broadcast message includes decoding the multicast message or the broadcast message based at least in part on ignoring the one or more reserved fields or the one or more fields associated with the RLC-AM.

In a tenth additional aspect, alone or in combination with one or more of the first through ninth aspects, process 700 includes receiving a packet associated with the multicast message or the broadcast message that includes a field indicating that the packet is a retransmission or a redundancy packet for a network coding feature or a forward error correction feature.

In an eleventh additional aspect, alone or in combination with one or more of the first through tenth aspects, process 700 includes receiving a packet associated with the multicast message or the broadcast message that uses a PDCP PDU format associated with redundancy packets for a network coding feature or a forward error correction feature.

In a twelfth additional aspect, alone or in combination with one or more of the first through eleventh aspects, receiving the packet includes receiving the packet that includes a field indicating a PDCP sequence number range associated with the packet or a Control PDU Type (CPT) field indicating that the packet is a redundancy packet.

In a thirteenth additional aspect, alone or in combination with one or more of the first through twelfth aspects, the UE is capable of operating only in accordance with the RLC-UM for multicast messages or broadcast messages, and process 700 includes receiving a packet associated with the multicast message or the broadcast message that indicates that the packet is a retransmission or a redundancy packet for a network coding feature or a forward error correction feature, and dropping the packet based at least in part on the packet being a redundancy packet for the network coding feature or the forward error correction feature.

In a fourteenth additional aspect, alone or in combination with one or more of the first through thirteenth aspects, the UE is capable of operating in accordance with the RLC-AM or the RLC-UM for multicast messages or broadcast messages, and process 700 includes receiving a packet associated with the multicast message or the broadcast message that indicates that the packet is a retransmission or a redundancy packet for a network coding feature or a forward error correction feature, and decoding the packet based at least in part on the indication that the packet is a retransmission or a redundancy packet for the network coding feature or the forward error correction feature.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a flowchart illustrating an example process 800 performed, for example, by a base station in accordance with the present disclosure. Example process 800 is an example where the base station (for example, base station 110) performs operations associated with RLC forward compatibility for multicast messages or broadcast messages.

As shown in FIG. 8, in some aspects, process 800 may include generating a multicast message or broadcast message using an RLC format associated with an RLC-AM (block 810). For example, the base station (such as by using signal generation component 1008, depicted in FIG. 10) may generate a multicast message or broadcast message using an RLC format associated with an RLC-AM, as described above.

As further shown in FIG. 8, in some aspects, process 800 may include transmitting the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message (block 820). For example, the base station (such as by using transmission component 1006, depicted in FIG. 10) may transmit the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message, as described above.

Process 800 may include additional aspects, such as any single aspect or any combination of aspects described below or in connection with one or more other processes described elsewhere herein.

In a first additional aspect, the first UE is capable of operating in the RLC-AM or the RLC-UM for multicast messages or broadcast messages and the second UE is capable of operating only on the RLC-UM for multicast messages or broadcast messages.

In a second additional aspect, alone or in combination with the first aspect, transmitting the multicast message or the broadcast message enables the second UE to operate in accordance with the RLC-UM based at least in part on ignoring one or more fields included in the multicast message or the broadcast message associated with the RLC-AM.

In a third additional aspect, alone or in combination with one or more of the first and second aspects, process 800 includes transmitting an RRC message indicating that the RLC-AM is to be used for multicast messages or broadcast messages, and transmitting the RRC message configures the first UE to operate in accordance with the RLC-AM and enables the second UE to identify that the RLC format associated with the RLC-AM is to be used by the base station.

In a fourth additional aspect, alone or in combination with one or more of the first through third aspects, the RLC format associated with the RLC-AM is an RLC PDU format for an MRB, and transmitting the multicast message or the broadcast message includes transmitting the multicast message or the broadcast message, using the RLC PDU format for the MRB, that includes one or more reserved fields or one or more fields associated with the RLC-AM in a header of the multicast message or the broadcast message.

In a fifth additional aspect, alone or in combination with one or more of the first through fourth aspects, transmitting the multicast message or the broadcast message includes transmitting the multicast message or the broadcast message including an indication in at least one of the one or more reserved fields indicating that the RLC-AM is to be used for the multicast message or the broadcast message, where including the indication in at least one of the one or more reserved fields enables the first UE to operate in the RLC-AM for the multicast message or the broadcast message.

In a sixth additional aspect, alone or in combination with one or more of the first through fifth aspects, process 800 includes transmitting a packet associated with the multicast message or the broadcast message that includes a field indicating that the packet is a retransmission or a redundancy packet for a network coding feature or a forward error correction feature.

In a seventh additional aspect, alone or in combination with one or more of the first through sixth aspects, process 800 includes transmitting a packet associated with the multicast message or the broadcast message that uses a PDCP PDU format associated with redundancy packets for a network coding feature or a forward error correction feature.

In an eighth additional aspect, alone or in combination with one or more of the first through seventh aspects, transmitting the packet includes transmitting the packet that includes a field indicating a PDCP sequence number range associated with the packet or a Control PDU Type (CPT) field indicating that the packet is a redundancy packet.

In a ninth additional aspect, alone or in combination with one or more of the first through eighth aspects, process 800 includes transmitting a packet associated with the multicast message or the broadcast message that indicates that the packet is a retransmission or a redundancy packet for a network coding feature or a forward error correction feature, and indicating that the packet is a retransmission or a redundancy packet enables the first UE to decode the packet and operate in the RLC-AM, and enables the second UE to drop the packet and operate in the RLC-UM.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

FIG. 9 is a block diagram of an example apparatus 900 for wireless communication in accordance with the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 6A-6E. Additionally or alternatively, the apparatus 900 may be configured to perform one or more processes described herein, such as process 700 of FIG. 7, or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

The communication manager 904 may receive or may cause the reception component 902 to receive, from a base station, a multicast message or a broadcast message that uses an RLC format associated with an RLC-AM. The communication manager 904 may decode the multicast message or the broadcast message to identify information associated with an RLC-UM based at least in part on a capability of the UE. The communication manager 904 may operate in accordance with the RLC-UM based at least in part on decoding the multicast message or the broadcast message. In some aspects, the communication manager 904 may perform one or more operations described elsewhere herein as being performed by one or more components of the communication manager 904.

The communication manager 904 may include a controller/processor, a memory, or a combination thereof, of the UE described above in connection with FIG. 2. In some aspects, the communication manager 904 includes a set of components, such as a decoding component 910, among other examples. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive, from a base station, a multicast message or a broadcast message that uses an RLC format associated with an RLC-AM. The decoding component 910 may decode the multicast message or the broadcast message to identify information associated with an RLC unacknowledged mode (RLC-UM) based at least in part on a capability of the UE. The reception component 902 or the transmission component 906 may operate in accordance with the RLC-UM based at least in part on decoding the multicast message or the broadcast message.

The reception component 902 may receive, from the base station, an RRC configuration that indicates that the RLC-AM is to be used for multicast messages or broadcast messages. The decoding component 910 may decode the multicast message or the broadcast message based at least in part on receiving the RRC configuration indicating that the RLC format associated with the RLC-AM is to be used by the base station. The reception component 902 or the transmission component 906 may operate in accordance with the RLC-UM based at least in part on decoding the multicast message or the broadcast message.

The reception component 902 may receive, from the base station, an RRC configuration that indicates that the RLC-AM is to be used for multicast messages or broadcast messages. The decoding component 910 may decode the multicast message or the broadcast message based at least in part on ignoring one or more fields associated with the RLC-AM in the multicast message or the broadcast message.

The reception component 902 may receive a packet associated with the multicast message or the broadcast message that includes a field indicating that the packet is a retransmission or a redundancy packet for a network coding feature or a forward error correction feature.

The reception component 902 may receive a packet associated with the multicast message or the broadcast message that uses PDCP PDU format associated with redundancy packets for a network coding feature or a forward error correction feature.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

FIG. 10 is a block diagram of an example apparatus 1000 for wireless communication in accordance with the present disclosure. The apparatus 1000 may be a base station, or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 6A-6E. Additionally or alternatively, the apparatus 1000 may be configured to perform one or more processes described herein, such as process 800 of FIG. 8, or a combination thereof. In some aspects, the apparatus 1000 may include one or more components of the base station described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may generate a multicast message or broadcast message using an RLC format associated with an RLC-AM. The communication manager 1004 may transmit or may cause the transmission component 1006 to transmit the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message. In some aspects, the communication manager 1004 may perform one or more operations described elsewhere herein as being performed by one or more components of the communication manager 1004.

The communication manager 1004 may include a controller/processor, a memory, a scheduler, a communication unit, or a combination thereof, of the base station described above in connection with FIG. 2. In some aspects, the communication manager 1004 includes a set of components, such as a signal generation component 1010, among other examples. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The signal generation component 1010 may generate a multicast message or broadcast message using an RLC format associated with an RLC-AM. The transmission component 1006 may transmit the multicast message or the broadcast message that uses the RLC format associated with the RLC-AM, where transmitting the multicast message or broadcast message enables a first UE to operate in accordance with the RLC-AM for the multicast or the broadcast message and enables a second UE to operate in accordance with an RLC-UM for the multicast or the broadcast message.

The transmission component 1006 may transmit an RRC message indicating that the RLC-AM is to be used for multicast messages or broadcast messages, where transmitting the RRC message configures the first UE to operate in accordance with the RLC-AM and enables the second UE to identify that the RLC format associated with the RLC-AM is to be used by the base station.

The transmission component 1006 may transmit a packet associated with the multicast message or the broadcast message that includes a field indicating that the packet is a retransmission or a redundancy packet for a network coding feature or a forward error correction feature.

The transmission component 1006 may transmit a packet associated with the multicast message or the broadcast message that uses a PDCP PDU format associated with redundancy packets for a network coding feature or a forward error correction feature.

The transmission component 1006 may transmit a packet associated with the multicast message or the broadcast message that indicates that the packet is a retransmission or a redundancy packet for a network coding feature or a forward error correction feature where indicating that the packet is a retransmission or a redundancy packet enables the first UE to decode the packet and operate in the RLC-AM, and enables the second UE to drop the packet and operate in the RLC-UM.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a multicast message or a broadcast message that uses a radio link control (RLC) format associated with an RLC acknowledged mode (RLC-AM); decoding the multicast message or the broadcast message to identify information associated with an RLC unacknowledged mode (RLC-UM) based at least in part on a capability of the UE; and operating in accordance with the RLC-UM based at least in part on decoding the multicast message or the broadcast message.

Aspect 2: The method of Aspect 1, wherein the UE supports the RLC format associated with the RLC-AM and a different RLC format associated with the RLC-UM, and wherein the UE is capable of operating only in accordance with the RLC-UM for multicast messages or broadcast messages.

Aspect 3: The method of Aspect 1, wherein the UE supports only the RLC format associated with the RLC-AM, and wherein the UE is capable of operating only in accordance with the RLC-UM for multicast messages or broadcast messages.

Aspect 4: The method of any of Aspect 1-3, wherein decoding the multicast message or the broadcast message comprises: identifying one or more fields associated with the RLC-AM in the multicast message or the broadcast message; and decoding the multicast message or the broadcast message based at least in part on extracting information associated with the RLC-UM from one or more other fields of the multicast message or the broadcast message and ignoring the one or more fields associated with the RLC-AM.

Aspect 5: The method of Aspect 1-4, wherein operating in accordance with the RLC-UM comprises operating in accordance with the RLC-UM based at least in part on extracting the information from one or more fields of the multicast message or the broadcast message associated with the RLC-UM.

Aspect 6: The method of any of Aspects 1-5, wherein the UE is capable of operating in accordance with the RLC-AM or the RLC-UM for multicast messages or broadcast messages, the method further comprising receiving a radio resource control (RRC) configuration indicating that the UE is to operate in accordance with the RLC-UM for multicast messages or broadcast messages, and wherein decoding the multicast message or the broadcast message comprises decoding the multicast message or the broadcast message based at least in part on extracting information associated with the RLC-UM from one or more other fields of the multicast message or the broadcast message and ignoring the one or more fields associated with the RLC-AM.

Aspect 7: The method of any of Aspects 1-6, further comprising: receiving, from the base station, a radio resource control (RRC) configuration that indicates that the RLC-AM is to be used for multicast messages or broadcast messages, wherein decoding the multicast message or the broadcast message comprises decoding the multicast message or the broadcast message based at least in part on receiving the RRC configuration indicating that the RLC format associated with the RLC-AM is to be used by the base station, and wherein operating in accordance with the RLC-UM comprises operating in accordance with the RLC-UM based at least in part on decoding the multicast message or the broadcast message.

Aspect 8: The method of any of Aspects 1-7, further comprising receiving, from the base station, a radio resource control (RRC) configuration that indicates that the RLC-AM is to be used for multicast messages or broadcast messages; and wherein decoding the multicast message or the broadcast message comprises decoding the multicast message or the broadcast message based at least in part on ignoring one or more fields associated with the RLC-AM in the multicast message or the broadcast message.

Aspect 9: The method of any of Aspects 1-8, wherein the RLC format associated with the RLC-AM is an RLC packet data unit (PDU) format for a multicast or broadcast radio bearer (MRB), and wherein receiving the multicast message or the broadcast message comprises receiving the multicast message or the broadcast message, using the RLC PDU format for the MRB, that includes one or more reserved fields or one or more fields associated with the RLC-AM in a header of the multicast message or the broadcast message.

Aspect 10: The method of Aspect 9, wherein decoding the multicast message or the broadcast message comprises decoding the multicast message or the broadcast message based at least in part on ignoring the one or more reserved fields or the one or more fields associated with the RLC-AM.

Aspect 11: The method of any of Aspects 1-10, further comprising receiving a packet associated with the multicast message or the broadcast message that includes a field indicating that the packet is a retransmission or a redundancy packet for a network coding feature or a forward error correction feature.

Aspect 12: The method of any of Aspects 1-11, further comprising receiving a packet associated with the multicast message or the broadcast message that uses a packet data convergence protocol (PDCP) packet data unit (PDU) format associated with redundancy packets for a network coding feature or a forward error correction feature.

Aspect 13: The method of Aspect 12, wherein receiving the packet comprises receiving the packet that includes a field indicating a PDCP sequence number range associated with the packet or a Control PDU Type (CPT) field indicating that the packet is a redundancy packet.

Aspect 14: The method of any of Aspects 1-13, wherein the UE is capable of operating only in accordance with the RLC-UM for multicast messages or broadcast messages, the method further comprising: receiving a packet associated with the multicast message or the broadcast message that indicates that the packet is a retransmission or a redundancy packet for a network coding feature or a forward error correction feature; and dropping the packet based at least in part on the packet being a retransmission or a redundancy packet for the network coding feature or the forward error correction feature.

Aspect 15: The method of any of Aspects 1-14, wherein the UE is capable of operating in accordance with the RLC-AM or the RLC-UM for multicast messages or broadcast messages, the method further comprising: receiving a packet associated with the multicast message or the broadcast message that indicates that the packet is a retransmission or a redundancy packet for a network coding feature or a forward error correction feature; and decoding the packet based at least in part on the indication that the packet is a retransmission or a redundancy packet for the network coding feature or the forward error correction feature.

Aspect 16: A method of wireless communication performed by a base station, comprising: generating a multicast message or broadcast message using a radio link control (RLC) format associated with an RLC acknowledged mode (RLC-AM); and transmitting the multicast message or the broadcast message that uses the RLC format associated with the RLC-AM, wherein transmitting the multicast message or broadcast message enables a first user equipment (UE) to operate in accordance with the RLC-AM for the multicast or the broadcast message and enables a second UE to operate in accordance with an RLC unacknowledged mode (RLC-UM) for the multicast or the broadcast message.

Aspect 17: The method of Aspect 16, wherein the first UE is capable of operating in the RLC-AM or the RLC-UM for multicast messages or broadcast messages and the second UE is capable of operating only on the RLC-UM for multicast messages or broadcast messages.

Aspect 18: The method of any of Aspects 16-17, wherein transmitting the multicast message or the broadcast message enables the second UE to operate in accordance with the RLC-UM based at least in part on ignoring one or more fields included in the multicast message or the broadcast message associated with the RLC-AM.

Aspect 19: The method of any of Aspects 16-18, further comprising transmitting a radio resource control (RRC) message indicating that the RLC-AM is to be used for multicast messages or broadcast messages, wherein transmitting the RRC message configures the first UE to operate in accordance with the RLC-AM and enables the second UE to identify that the RLC format associated with the RLC-AM is to be used by the base station.

Aspect 20: The method of any of Aspects 16-19, wherein the RLC format associated with the RLC-AM is an RLC packet data unit (PDU) format for a multicast or broadcast radio bearer (MRB), and wherein transmitting the multicast message or the broadcast message comprises transmitting the multicast message or the broadcast message, using the RLC PDU format for the MRB, that includes one or more reserved fields or one or more fields associated with the RLC-AM in a header of the multicast message or the broadcast message.

Aspect 21: The method of Aspect 20, wherein transmitting the multicast message or the broadcast message comprises transmitting the multicast message or the broadcast message including an indication in at least one of the one or more reserved fields indicating that the RLC-AM is to be used for the multicast message or the broadcast message, wherein including the indication in at least one of the one or more reserved fields enables the first UE to operate in the RLC-AM for the multicast message or the broadcast message.

Aspect 22: The method of any of Aspects 16-21, further comprising transmitting a packet associated with the multicast message or the broadcast message that includes a field indicating that the packet is a retransmission or a redundancy packet for a network coding feature or a forward error correction feature.

Aspect 23: The method of any of Aspects 16-22, further comprising transmitting a packet associated with the multicast message or the broadcast message that uses a packet data convergence protocol (PDCP) packet data unit (PDU) format associated with redundancy packets for a network coding feature or a forward error correction feature.

Aspect 24: The method of Aspect 23, wherein transmitting the packet comprises transmitting the packet that includes a field indicating a PDCP sequence number range associated with the packet or a Control PDU Type (CPT) field indicating that the packet is a redundancy packet.

Aspect 25: The method of any of Aspects 16-24, further comprising transmitting a packet associated with the multicast message or the broadcast message that indicates that the packet is a retransmission or a redundancy packet for a network coding feature or a forward error correction feature, and wherein indicating that the packet is a retransmission or a redundancy packet enables the first UE to decode the packet and operate in the RLC-AM, and enables the second UE to drop the packet and operate in the RLC-UM.

Aspect 26: An apparatus for wireless communication at a device, comprising a processor; memory coupled with the processor; and instructions stored in the memory and executable by the processor to cause the apparatus to perform the method of one or more Aspects of Aspects 1-15.

Aspect 27: A device for wireless communication, comprising a memory and one or more processors coupled to the memory, the memory and the one or more processors configured to perform the method of one or more Aspects of Aspects 1-15.

Aspect 28: An apparatus for wireless communication, comprising at least one means for performing the method of one or more Aspects of Aspects 1-15.

Aspect 29: A non-transitory computer-readable medium storing code for wireless communication, the code comprising instructions executable by a processor to perform the method of one or more Aspects of Aspects 1-15.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 31: An apparatus for wireless communication at a device, comprising a processor; memory coupled with the processor; and instructions stored in the memory and executable by the processor to cause the apparatus to perform the method of one or more Aspects of Aspects 15-25.

Aspect 32: A device for wireless communication, comprising a memory and one or more processors coupled to the memory, the memory and the one or more processors configured to perform the method of one or more Aspects of Aspects 15-25.

Aspect 33: An apparatus for wireless communication, comprising at least one means for performing the method of one or more Aspects of Aspects 15-25.

Aspect 34: A non-transitory computer-readable medium storing code for wireless communication, the code comprising instructions executable by a processor to perform the method of one or more Aspects of Aspects 15-25.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 15-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
one or more memories storing processor-readable code; and
one or more processors coupled with the one or more memories and operable to cause the UE to:
receive, from a network entity, a multicast message or a broadcast message having a radio link control (RLC) format associated with an RLC acknowledged mode (RLC-AM);
decode the multicast message or the broadcast message to identify information associated with the RLC-AM and information associated with an RLC unacknowledged mode (RLC-UM); and
operate in accordance with the RLC-UM in association with one or more of a radio resource control (RRC) configuration or one or more bits associated with the RLC-UM in a header of the multicast message or the broadcast message.

2. The UE of claim 1, wherein the one or more processors are further operable to cause the UE to receive the RRC configuration, and
wherein the RRC configuration indicates that the UE is to operate in accordance with the RLC-UM for multicast messages or broadcast messages.

3. The UE of claim 2, wherein, to cause the UE to decode the multicast message or the broadcast message, the one or more processors are operable to cause the UE to extract the information associated with the RLC-UM from one or more other fields of the multicast message or the broadcast message.

4. The UE of claim 1, wherein the RLC format associated with the RLC-AM is an RLC packet data unit (PDU) format for a multicast or broadcast radio bearer (MRB), and wherein, to cause the UE to receive the multicast message or the broadcast message, the one or more processors are operable to cause the UE to use the RLC PDU format for the MRB.

5. The UE of claim 4, wherein the one or more processors are further operable to cause the UE to receive the RRC configuration, wherein the RRC configuration indicates that the UE is to operate in accordance with the RLC-UM for multicast messages or broadcast messages, and
wherein, to cause the UE to decode the multicast message or the broadcast message, the one or more processors are operable to cause the UE to extract the information associated with the RLC-UM from the RLC PDU format for the MRB.

6. The UE of claim 5, wherein the information associated with the RLC-UM comprises segmentation information or a sequence number associated with a data field of a PDU.

7. A user equipment (UE) for wireless communication, comprising:
one or more memories storing processor-readable code; and
one or more processors coupled with the one or more memories and operable to cause the UE to:
receive, from a network entity, a multicast message or a broadcast message having a radio link control (RLC) format associated with an RLC acknowledged mode (RLC-AM);
decode the multicast message or the broadcast message to identify information associated with the RLC-AM; and
operate in accordance with the RLC-AM in association with one or more bits associated with the RLC-AM in a header of the multicast message or the broadcast message.

8. The UE of claim 7, wherein the one or more processors are further operable to cause the UE to receive a radio resource control (RRC) configuration, and
wherein the RRC configuration indicates that the UE is to operate in accordance with the RLC-AM for multicast messages or broadcast messages.

9. The UE of claim 7, wherein, to cause the UE to decode the multicast message or the broadcast message, the one or more processors are operable to cause the UE to extract the information associated with the RLC-AM from one or more fields of the multicast message or the broadcast message.

10. The UE of claim 7, wherein the RLC format associated with the RLC-AM is an RLC packet data unit (PDU) format for a multicast or broadcast radio bearer (MRB), and wherein, to cause the UE to receive the multicast message or the broadcast message, the one or more processors are operable to cause the UE to use the RLC PDU format for the MRB, and
wherein the one or more bits in the header of the multicast message or the broadcast message include one or more reserved fields or one or more fields associated with the RLC-AM.

11. The UE of claim 10, wherein, to cause the UE to decode the multicast message or the broadcast message, the one or more processors are operable to cause the UE to extract the information associated with the RLC-AM from the RLC PDU format for the MRB.

12. The UE of claim 11, wherein the information associated with the RLC-AM comprises a polling indicator or segmentation offset information.

13. The UE of claim 10, wherein, to cause the UE to decode the multicast message or the broadcast message, the one or more processors are operable to cause the UE to decode the multicast message or the broadcast message based at least in part on the one or more reserved fields or the one or more fields associated with the RLC-AM.

14. A method of wireless communication performed by a user equipment (UE), comprising:
receiving, from a network entity, a multicast message or a broadcast message having a radio link control (RLC) format associated with an RLC acknowledged mode (RLC-AM);
decoding the multicast message or the broadcast message to identify information associated with the RLC-AM; and
operating in accordance with the RLC-AM in association with one or more bits associated with the RLC-AM in a header of the multicast message or the broadcast message.

15. The method of claim 14, further comprising receiving a radio resource control (RRC) configuration, wherein the RRC configuration indicates that the UE is to operate in accordance with the RLC-AM for multicast messages or broadcast messages.

16. The method of claim 14, wherein decoding the multicast message or the broadcast message comprises extracting the information associated with the RLC-AM from one or more fields of the multicast message or the broadcast message.

17. The method of claim 14, wherein the RLC format associated with the RLC-AM is an RLC packet data unit (PDU) format for a multicast or broadcast radio bearer (MRB), and
receiving the multicast message or the broadcast message comprises receiving the multicast message or the broadcast message using the RLC PDU format for the MRB.

18. The method of claim 17, wherein decoding the multicast message or the broadcast message comprises extracting the information associated with the RLC-AM from the RLC PDU format for the MRB.

19. The method of claim 18, wherein the information associated with the RLC-AM comprises a polling indicator or segmentation offset information.

20. The method of claim 17, wherein decoding the multicast message or the broadcast message comprises decoding the multicast message or the broadcast message based at least in part on the one or more reserved fields or the one or more fields associated with the RLC-AM.

* * * * *